(12) United States Patent
Dudar

(10) Patent No.: US 10,914,249 B2
(45) Date of Patent: Feb. 9, 2021

(54) METHOD AND SYSTEM FOR EVAPORATIVE EMISSIONS SYSTEM PURGING DURING ENGINE RESTART

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 273 days.

(21) Appl. No.: 16/183,044

(22) Filed: Nov. 7, 2018

(65) Prior Publication Data

US 2020/0141339 A1   May 7, 2020

(51) Int. Cl.
| | |
|---|---|
| *F02D 41/00* | (2006.01) |
| *F02M 25/08* | (2006.01) |
| *F02N 11/08* | (2006.01) |
| *B60K 6/24* | (2007.10) |
| *B60W 20/40* | (2016.01) |

(52) U.S. Cl.
CPC .............. *F02D 41/004* (2013.01); *B60K 6/24* (2013.01); *B60W 20/40* (2013.01); *F02M 25/089* (2013.01); *F02M 25/0836* (2013.01); *F02N 11/0829* (2013.01); *B60W 2710/06* (2013.01); *B60W 2710/083* (2013.01)

(58) Field of Classification Search
CPC .............. F02N 11/0829; F02N 11/084; F02M 25/0836; F02M 25/089; F02D 41/004; F02D 41/003; F02D 41/0032
See application file for complete search history.

(56) References Cited

U.S. PATENT DOCUMENTS

| | | | |
|---|---|---|---|
| 3,957,930 A * | 5/1976 | Birmingham | ............ F02M 9/06 |
| | | | 261/44.3 |
| 5,261,379 A | 11/1993 | Lipinski et al. | |
| 5,614,665 A | 3/1997 | Curran et al. | |
| 6,308,559 B1 | 10/2001 | Davison | |
| 6,382,191 B1 | 5/2002 | Curran et al. | |
| 7,305,975 B2 | 12/2007 | Reddy | |
| 9,512,791 B1 | 12/2016 | Dudar et al. | |
| 9,797,348 B2 | 10/2017 | Dudar | |
| 9,822,719 B2 | 11/2017 | Dudar et al. | |
| 10,060,367 B2 | 8/2018 | Pursifull | |
| 2003/0010095 A1 * | 1/2003 | Hirano | ............... F02M 25/0809 |
| | | | 73/49.7 |

(Continued)

FOREIGN PATENT DOCUMENTS

WO    2007051291 A1    5/2007

*Primary Examiner* — Sizo B Vilakazi
*Assistant Examiner* — Anthony L Bacon
(74) *Attorney, Agent, or Firm* — Geoffrey Brumbaugh; McCoy Russell LLP

(57) ABSTRACT

Methods and systems are provided for purging a fuel vapor storage canister in an evaporative emissions system of a vehicle. In one example, a method may include generating vacuum in a fuel tank fluidically coupled to the fuel vapor storage canister during an auto-stop of an engine while the engine spins down to rest, and purging vapors to an intake manifold of the engine during a subsequent restart of the engine. In this way, the fuel tank may be held at a vacuum while the engine is off, enabling more efficient purging of the fuel vapor storage canister when the engine is restarted.

20 Claims, 6 Drawing Sheets

(56) References Cited

U.S. PATENT DOCUMENTS

| | | | | |
|---|---|---|---|---|
| 2004/0226353 A1* | 11/2004 | Yamaguchi | ............ | G01M 3/025 73/114.41 |
| 2006/0278202 A1* | 12/2006 | Sieber | ................... | F02N 99/006 123/520 |
| 2011/0166765 A1* | 7/2011 | DeBastos | .............. | F02D 41/021 701/102 |
| 2011/0295482 A1* | 12/2011 | Pearce | ............. | B60K 15/03504 701/102 |
| 2013/0032127 A1* | 2/2013 | Jentz | ................. | F02M 25/0809 123/520 |
| 2014/0069394 A1* | 3/2014 | Jentz | ................. | F02M 25/0809 123/520 |
| 2014/0130781 A1* | 5/2014 | Jentz | ................. | F02M 25/0827 123/520 |
| 2014/0230795 A1* | 8/2014 | Jentz | ................. | F02M 37/0064 123/520 |
| 2016/0025588 A1 | 1/2016 | Dudar | | |

* cited by examiner

METHOD AND SYSTEM FOR EVAPORATIVE EMISSIONS SYSTEM PURGING DURING ENGINE RESTART

FIELD

The present description relates generally to methods and systems for controlling an evaporative emissions system of a vehicle.

BACKGROUND/SUMMARY

Vehicle evaporative emissions systems may be configured to store refueling, running loss, and diurnal fuel vapors from a fuel tank in a fuel vapor storage canister containing a suitable adsorbent and then purge the stored vapors during a subsequent engine operation. The stored vapors may be routed to an engine intake for combustion, further increasing fuel economy, for example. In a typical canister purge operation, a canister purge valve coupled between the engine intake and the fuel vapor storage canister is opened, allowing for intake manifold vacuum to be applied to the fuel vapor storage canister. Simultaneously, an open canister vent valve coupled between the fuel vapor storage canister and atmosphere allows for fresh air to enter the fuel vapor storage canister. This configuration facilitates desorption of stored fuel vapors from the adsorbent material in the canister, regenerating the adsorbent material for further fuel vapor adsorption.

However, reduced engine operation times in stop-start and hybrid vehicles can lead to insufficient purging of fuel vapors from the evaporative emissions system. As one example, purging vapors from the fuel vapor storage canister may be inefficient after an engine shutdown event due to the fuel tank equilibrating with atmospheric pressure during the shutdown, making the fuel tank a less restrictive flow path than the fuel vapor storage canister. As a result, vapors are first drawn from the fuel tank until the fuel tank reaches sufficient vacuum for the fuel vapor storage canister to become the less restrictive flow path. The time it takes to establish vacuum in the fuel tank results in lost canister purging opportunities during a drive cycle. Residual hydrocarbons that are not purged may desorb over a diurnal cycle, leading to an increase in bleed emissions, for example. Additionally, the capability of the canister to trap additional vapors from the fuel tank greatly depends upon how thoroughly the vapors are purged from the canister when the engine was last operated. Accordingly, systems and methods that increase canister purging efficiency in vehicles with reduced engine operation times may reduce overall vehicle emissions.

Other attempts to address fuel vapor storage canister purging in vehicles with reduced engine operation times include reducing or preventing vacuum generation in the fuel tank during purging. One example approach is shown by Pursifull et al. in U.S. Pat. No. 10,060,367. Therein, a vapor blocking valve is included in a first conduit that couples the fuel tank to the fuel vapor storage canister on a load/purge side, and the fuel tank is coupled to the fuel vapor canister on a fresh air side via a second conduit that includes a restriction. During purging, the vapor blocking valve is maintained closed, and because the fuel tank is coupled to the vapor canister on the fresh air side (and not on the load/purge side due to the closed vapor blocking valve), the vacuum applied to the fuel tank is shallow relative to when the fuel tank is coupled to the canister on the load/purge side, enabling deeper vapor canister vacuum for efficient purging.

However, the inventor herein has recognized potential issues with such systems. As one example, the vapor blocking valve and the second conduit add additional components to the evaporative emissions system, increasing vehicle costs. Further, both the vapor blocking valve and the second conduit provide additional potential sources of degradation. For example, the vapor blocking valve may become degraded and stuck open, resulting in higher vacuum being applied to the fuel tank during purging, or degraded and stuck closed, preventing the fuel tank from venting fuel vapors to the load/purge side of the fuel vapor storage canister. As another example, degradation of the second conduit may result in undesired evaporative emissions escaping to atmosphere.

In one example, the issues described above may be addressed by a method comprising: generating vacuum in a fuel tank fluidically coupled to an evaporative emissions system during an auto-stop of an engine while the engine spins down to rest; and purging vapors to an intake manifold of the engine during a subsequent auto-start of the engine while an amount of vacuum in the fuel tank is greater than a lower threshold. In this way, a fuel vapor storage canister of the evaporative emissions system may be purged efficiently without adding additional valves and conduits to the evaporative emissions system.

As one example, as the engine spins down to rest, a canister vent valve in a vent line that couples the evaporative emissions system to atmosphere is commanded closed, sealing the evaporative emissions and the fuel tank from the atmosphere. At the same time, a canister purge valve in a purge line that couples the evaporative emissions system to the intake manifold is commanded open, coupling the fuel tank to the intake manifold. With the canister vent valve closed and the canister purge valve open, vacuum is applied to the fuel tank by the rotating but non-combusting engine as it spins down to rest. In particular, intake manifold vacuum is primarily directed at a vapor space of the fuel tank and not a fuel vapor storage canister of the evaporative emissions system because a first flow path, which fluidically couples the fuel tank and the intake manifold, is less restrictive than a second flow path, which fluidically couples the fuel vapor storage canister and the intake manifold. In response to an amount of vacuum generated in the fuel tank reaching an upper threshold, the canister purge valve is closed to seal the fuel tank from the intake manifold and trap the vacuum inside the fuel tank. As an example, the upper threshold is determined based on an expected duration of the auto-stop, the expected duration estimated based on data received from vehicle-to-vehicle and vehicle-to-infrastructure networks. For example, as the expected duration of the auto-stop increases, the upper threshold is increased in order to account for natural vacuum decay that will occur over time as the engine is off. In some examples, in response to the amount of vacuum in the fuel tank decaying to a lower threshold, additional vacuum is applied to the fuel tank. For example, the additional vacuum may be applied by a vacuum pump included in the evaporative emissions system. In another example, the additional vacuum may be applied by the intake manifold, such as by restarting the engine and temporarily operating the engine to generate intake manifold vacuum. During the subsequent auto-start of the engine, the canister purge valve and the canister vent valve are commanded open to purge vapors from the evaporative emissions system to the intake manifold for combustion in the engine. In particular, with the canister vent valve open, the intake manifold vacuum is primarily directed at the fuel vapor storage canister and not the vapor space of the fuel tank because the vacuum of the fuel tank makes the first flow path more restrictive. In this way, the fuel vapor storage canister is efficiently purged upon engine restart without first re-establishing vacuum in the fuel tank.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
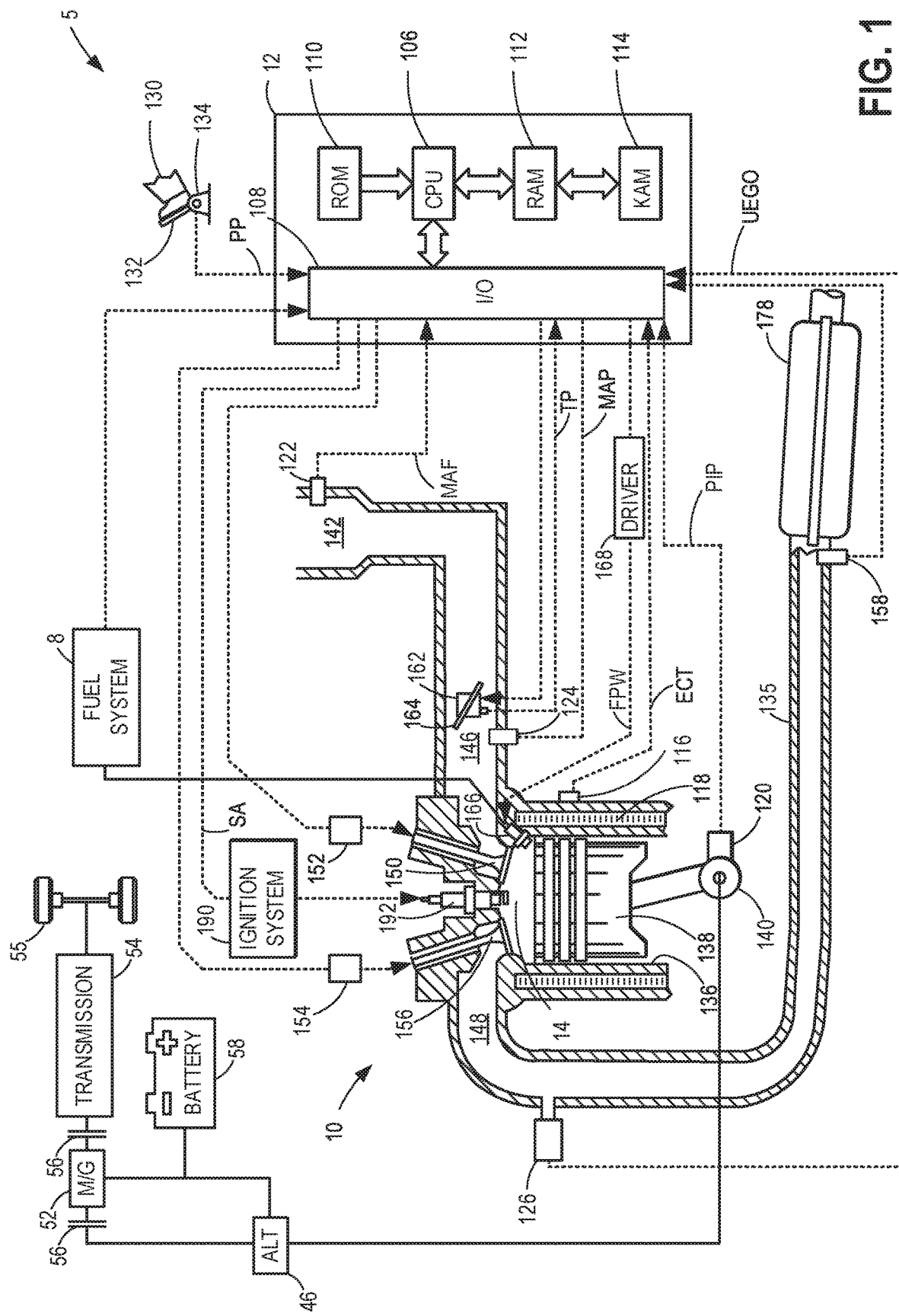
FIG. 1 shows a schematic depiction of an example vehicle system.
Figure 2:
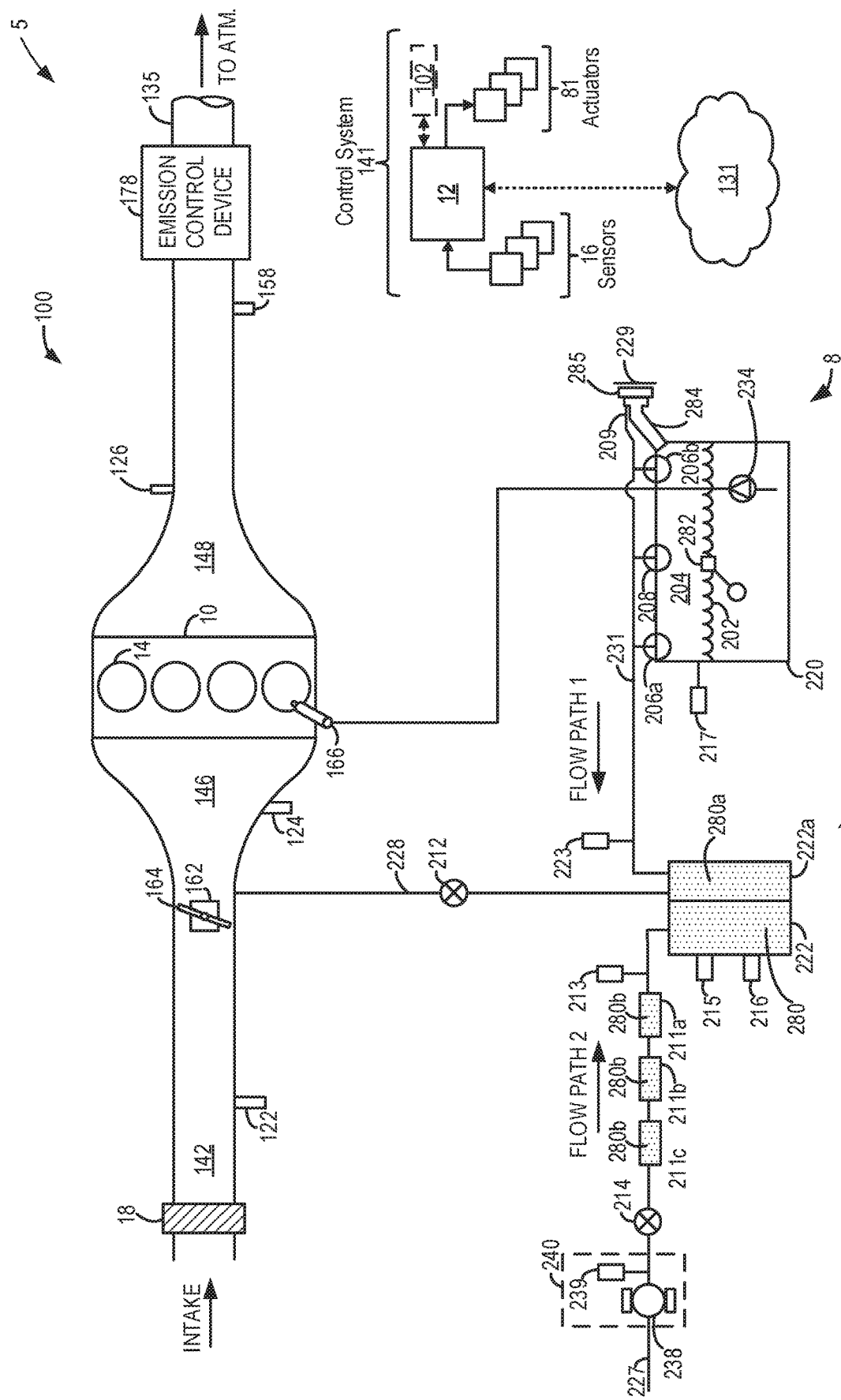
FIG. 2 shows a schematic depiction of a fuel system and evaporative emission system coupled to an engine system.
Figure 4:
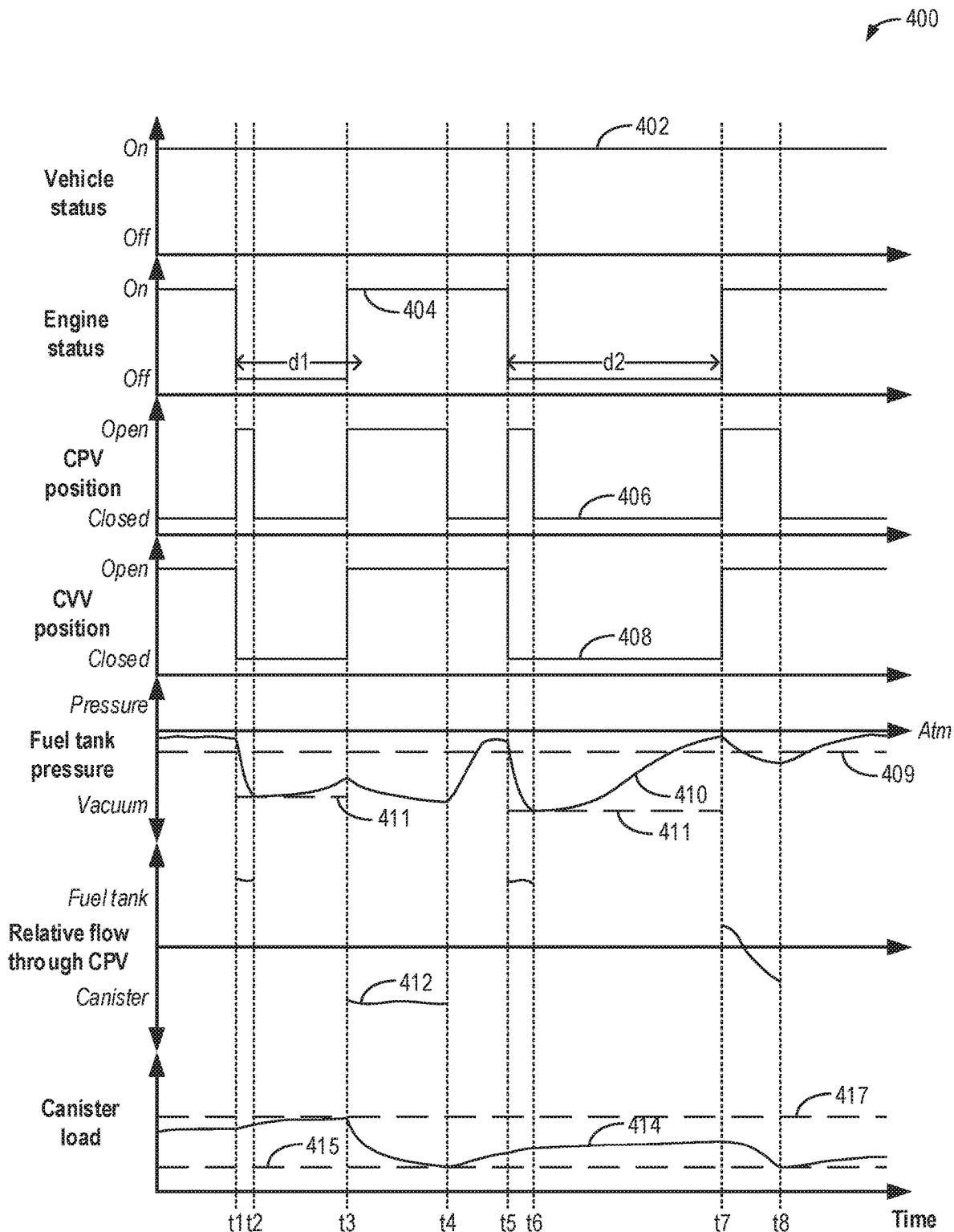
FIG. 4 shows an example timeline of adjusting evaporative emissions system valves while pulling down an engine and subsequently pulling up the engine in an engine system that does not include a vacuum pump in the evaporative emissions system.
Figure 5:
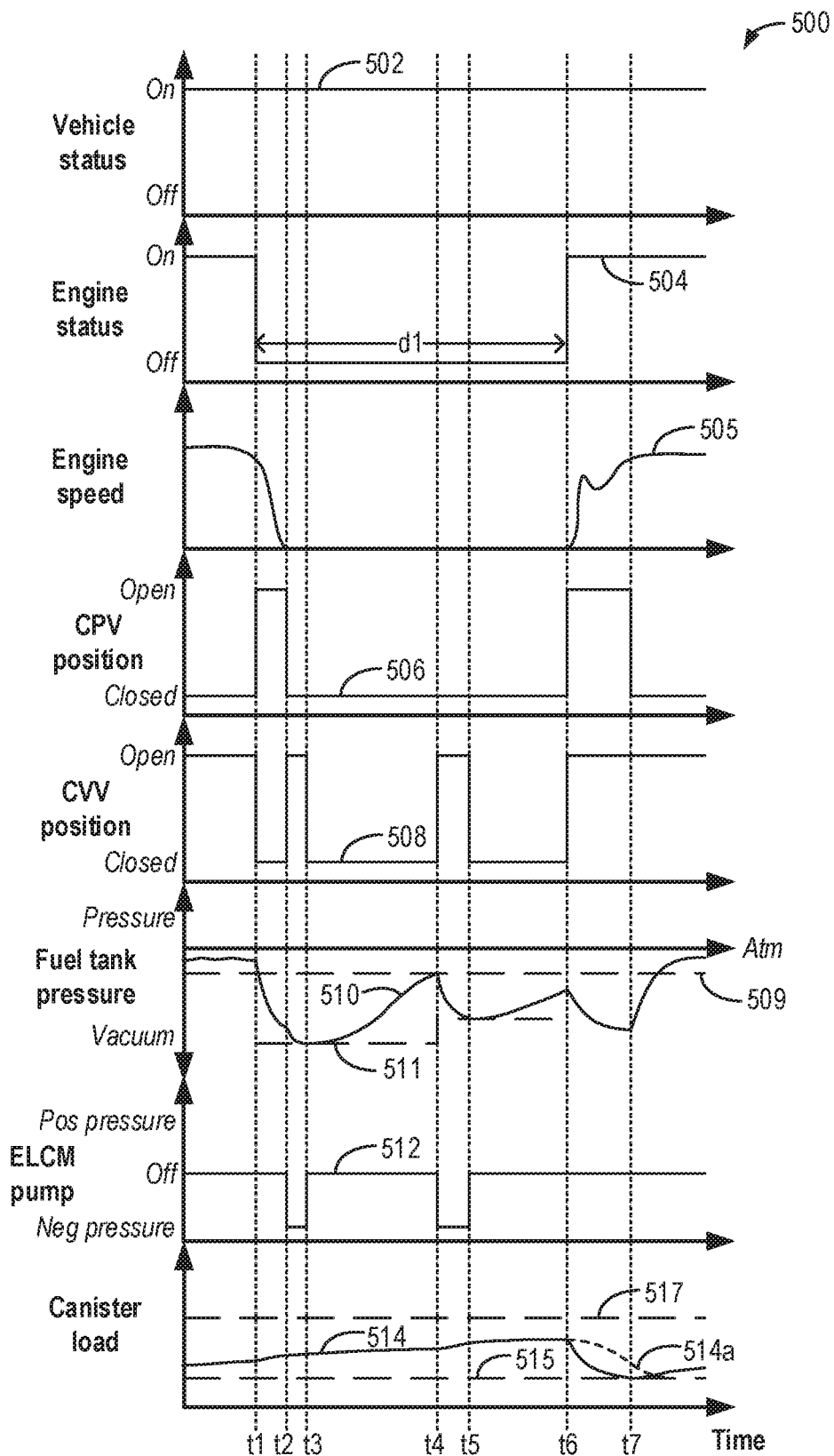
FIG. 5 shows an example timeline of adjusting evaporative emissions system valves while pulling down an engine and subsequently pulling up the engine in an engine system that includes a vacuum pump in the evaporative emissions system.

The following description relates to systems and methods for purging a fuel vapor storage canister in an evaporative emissions system of a hybrid or stop-start vehicle, such as the example vehicle depicted in FIGS. 1 and 2. In particular, the fuel vapor storage canister may be fluidically coupled to a fuel tank of a fuel system, as shown in FIG. 2, and configured to store fuel vapors from the fuel tank. Vacuum may be generated and held in the fuel tank during an engine auto-stop by adjusting valves of the evaporative emissions system, such as according to the example method of FIGS. 3A and 3B. As also described with respect to the method of FIGS. 3A and 3B, the valves may be further adjusted during the subsequent engine restart in order to quickly purge the fuel vapor canister during engine operation. Two prophetic example timelines for generating vacuum in the fuel tank while the engine is shut down for an auto-stop and then purging the fuel vapor canister upon engine restart are illustrated in FIGS. 4 and 5. By maintaining vacuum in the fuel tank during the engine auto-stop, fuel vapor storage canister purging may be expedited and the fuel vapor storage canister may be more completely cleaned.

Regarding terminology used herein, "vacuum" may also be termed "negative pressure." Both vacuum and negative pressure refer to a pressure lower than atmospheric pressure.

Turning now to the figures, FIG. 1 depicts an example of a cylinder 14 of an internal combustion engine 10, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. As used herein, the phrases "rotating the engine" and "spinning the engine" refer to crankshaft 140 rotating about its central axis. Further, "spinning down" and "pulling down" the engine refer momentum of the engine continuing to rotate crankshaft 140 after combustion is discontinued in engine 10 until the engine speed reaches zero. Similarly, "spinning up" and "pulling up" the engine refers to increasing the engine speed from zero to start (or restart) engine 10. Crankshaft 140 may be coupled to at least one vehicle wheel 55 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle embodiments, a system battery 58 may be a traction battery that delivers electrical power to electric machine 52 to provide torque to vehicle wheels 55. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate a power output of the alternator based upon system usage requirements, including auxiliary system demands.

Cylinder 14 of engine 10 can receive intake air via an intake passage 142 and an intake manifold 146. Intake manifold 146 can communicate with other cylinders of engine 10 in addition to cylinder 14. A throttle 162 including a throttle plate 164 may be provided in intake passage 142 for varying the flow rate and/or pressure of intake air provided to the engine cylinders.

An exhaust manifold 148 can receive exhaust gases from other cylinders of engine 10 in addition to cylinder 14. An exhaust gas sensor 126 is shown coupled to exhaust manifold 148 upstream of an emission control device 178 in an exhaust passage 135. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1, exhaust gas sensor 126 is a UEGO. Emission control device 178 may be a three-way catalyst, a NOx trap, various other emission control devices, or combinations thereof. In the example of FIG. 1, emission control device 178 is a three-way catalyst.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

Each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Alternatively, spark may be provided at a timing that is retarded from MBT to create a torque reserve. Controller 12 may input engine operating conditions, including engine speed, engine load, and exhaust gas AFR, into a look-up table and output the corresponding spark timing for the input engine operating conditions, for example.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal FPW received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

In an alternative example, fuel injector 166 may be arranged in an intake passage rather than coupled directly to cylinder 14 in a configuration that provides what is known as port injection of fuel (hereafter also referred to as "PFI") into an intake port upstream of cylinder 14. In yet other examples, cylinder 14 may include multiple injectors, which may be configured as direct fuel injectors, port fuel injectors, or a combination thereof. As such, it should be appreciated that the fuel systems described herein should not be limited by the particular fuel injector configurations described herein by way of example.

Fuel injector 166 may be configured to receive different fuels from fuel system 8 in varying relative amounts as a fuel mixture and further configured to inject this fuel mixture directly into cylinder. Further, fuel may be delivered to cylinder 14 during different strokes of a single cycle of the cylinder. For example, directly injected fuel may be delivered at least partially during a previous exhaust stroke, during an intake stroke, and/or during a compression stroke. As such, for a single combustion event, one or multiple injections of fuel may be performed per cycle. The multiple injections may be performed during the compression stroke, the intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

As will be described with respect to FIG. 2, in some examples, fuel system 8 may be coupled to an evaporative emissions system. Fuel vapors may be routed to the evaporative emissions system for storage before being purged to the engine intake for use as fuel at a later time.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 135; a profile ignition pickup signal (PIP) from a Hall effect sensor 120 (or other type) coupled to crankshaft 140; throttle position (TP) from a throttle position sensor coupled to throttle 162; signal UEGO from exhaust gas sensor 126, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Next, FIG. 2 schematically shows aspects of an example engine system 100, including engine 10, that may be coupled in vehicle 5. Components described with reference to FIG. 2 that have the same identification labels as components described with reference to FIG. 1 are the same components and may operate as previously described. Further, some components may not be reintroduced.

In the depicted example, air may enter intake passage 142 via an air filter 18. Intake manifold 146 is coupled to a plurality of cylinders 14 of engine 10 through a series of intake valves (e.g., intake valve 150 as shown in FIG. 1). Cylinders 14 are further coupled to exhaust manifold 148 via a series of exhaust valves (e.g., exhaust valve 156 as shown in FIG. 1). In the depicted embodiment, a single exhaust manifold 148 is shown. However, in other embodiments, the exhaust manifold may include a plurality of exhaust manifold sections. Configurations having a plurality of exhaust manifold sections may enable effluent from different combustion chambers to be directed to different locations in the engine system.

As shown in FIG. 2, exhaust from exhaust manifold 148 flows through emission control device 178. All or part of the treated exhaust from emission control device 178 may be released into the atmosphere via exhaust passage 135. Depending on operating conditions, however, in some examples of engine system 100, a portion of the exhaust may be diverted to intake passage 142 via an exhaust gas recirculation (EGR) passage (not shown), including an EGR cooler and an EGR valve.

Engine system 100 is shown coupled to fuel system 8 and an evaporative emissions system 219. Fuel system 8 includes a fuel tank 220 coupled to a fuel pump 234, the fuel tank supplying a fuel to engine 10 that propels vehicle 5. Fuel pump 234 is configured to deliver pressurized fuel to fuel injectors of engine 10, such as fuel injector 166. While only a single injector 166 is shown, each cylinder may be provided with a fuel injector 166 for directly injecting fuel therein. It will be appreciated that fuel system 8 may be a return-less fuel system, a return fuel system, or various other types of fuel system.

During a fuel tank refueling event, fuel may be pumped into the vehicle from an external source through a refueling port 284, such as when a gas cap 285 is removed and a fuel door 229 is open. Fuel tank 220 may hold a plurality of fuel blends, including fuel with a range of alcohol concentrations, such as various gasoline-ethanol blends, including E10, E85, gasoline, etc., and combinations thereof, as described with respect to FIG. 1.

A fuel level sensor 282 located in fuel tank 220 may provide an indication of a fuel level 202 ("Fuel Level Input") to controller 12. As depicted, fuel level sensor 282 may comprise a float connected to a variable resistor. Alternatively, other types of fuel level sensors may be used. A portion of fuel tank 220 above fuel level 202 comprises a vapor space 204 and may hold fuel vapors.

Evaporative emissions system 219 includes a fuel vapor storage canister 222. Vapors (e.g., fuel vapors) generated in fuel tank 220 may be routed to fuel vapor storage canister 222 via a conduit 231 for storage before being purged to intake manifold 146. For example, fuel tank 220 may include one or more vent valves for venting diurnal vapors and refueling vapors generated in the fuel tank to fuel vapor canister 222. The one or more vent valves may be electronically or mechanically actuated valves and may include active vent valves (e.g., valves that are actuated open or closed by controller) or passive vent valves (e.g., that are actuated open or closed passively based on a tank fill level). In the depicted example, fuel tank 220 includes gas vent valves (GVV) 206a and 206b at either end of fuel tank 220 and a fuel level vent valve (FLVV) 208, all of which are passive vent valves. Each of the vent valves 206a, 206b, and 208 may include a tube (not shown) that extends into vapor space 204 to a varying degree. Based on the fuel level 202 relative to vapor space 204 in the fuel tank, the vent valves may be open or closed. For example, GVV 206a and 206b may be normally open valves that enable diurnal and "running loss" vapors from the fuel tank to be released to fuel vapor storage canister 222, preventing over-pressurization of fuel tank 220. Further, GVV 206a and 206b may extend into vapor space 204 to a smaller degree than FLVV 208. FLVV 208 may be a normally open valve that prevents fuel tank overfilling. In particular, during fuel tank refilling, when fuel level 202 is raised to a fuel level threshold, FLVV 208 may close, causing pressure to build in a vapor line 209 that is coupled to refueling port 284 and conduit 231 as well as at a filler nozzle coupled to a fuel pump that is dispensing the fuel. The increase in pressure at the filler nozzle may stop the fuel fill process automatically, thereby preventing overfilling.

It will be appreciated that while the depicted embodiment shows vent valves 206a, 206b, and 208 as passive valves, in alternative embodiments, one or more of the vent valves may be configured as electronic valves electronically coupled to controller 12 (e.g., via wiring). Therein, the controller may send a signal to actuate the vent valves open or closed. In addition, the valves may include electronic feedback to communicate an open/closed status to the controller. However, such electronic valves may add substantial costs to the fuel system.

Further, in the example system depicted in FIG. 2, there are no restricting components (such as valves, orifices, nozzles, etc.) positioned in conduit 231 between fuel tank 220 and fuel vapor storage canister 222. In alternative examples, a valve, such as a vapor blocking valve, may be positioned in conduit 231 between fuel tank 220 and fuel vapor storage canister 222. The valve may enable the fuel tank to be selectively isolated from the evaporative emissions system, such as by closing (e.g., fully closing) the valve during fuel vapor storage canister purging. However, adding such a valve to the system increases vehicle costs and presents an additional potential source of degradation.

Fuel vapor storage canister 222 is filled with an appropriate adsorbent 280 for temporarily trapping fuel vapors (including vaporized hydrocarbons) generated during fuel tank refueling operations, diurnal vapors, and/or running-loss vapors. In one example, adsorbent 280 is activated charcoal (e.g., carbon). While a single fuel vapor storage canister 222 is shown, it will be appreciated that fuel system 8 and evaporative emissions system 219 may include any number of fuel vapor storage canisters. When purging conditions are met, such as when the fuel vapor storage canister is saturated, vapors stored in fuel vapor storage canister 222 may be purged to intake manifold 146 via a purge line 228 and by opening a canister purge valve (CPV) 212. For example, canister purge valve 212 may be a solenoid-actuated valve wherein opening or closing of the valve is performed via actuation of an associated canister purge solenoid. For example, CPV 212 may be a normally closed valve such that CPV 212 is held closed (e.g., fully closed) while the associated solenoid is deactivated (e.g., de-energized) and is commanded open (e.g., fully open) by activating (e.g., energizing) the solenoid. Further, in some examples, CPV 212 may be pulse width modulated by controller 12 by adjusting a pulse width of a control signal sent to the associated solenoid in order to precisely control a purge flow rate to intake manifold 146, as will be further described below.

Fuel vapor storage canister 222 may include a buffer 222a (or buffer region), each of the fuel vapor storage canister and the buffer comprising adsorbent. For example, buffer 222a is shown packed with an adsorbent 280a. As shown, the volume of buffer 222a may be smaller than (e.g., a fraction of) the volume of fuel vapor storage canister 222. Adsorbent 280a in the buffer 222a may be same as or different from adsorbent 280 in the fuel vapor storage canister (e.g., both may include charcoal). Buffer 222a may be positioned within fuel vapor storage canister 222 such that during fuel vapor storage canister loading, fuel tank vapors are first adsorbed within the buffer, and then when the buffer is saturated, additional fuel tank vapors are adsorbed in the fuel vapor storage canister. In comparison, during fuel vapor storage canister purging, fuel vapors are first desorbed from the fuel vapor storage canister (e.g., to a threshold amount) before being desorbed from the buffer. In other words, loading and unloading of the buffer is not linear with the loading and unloading of the fuel vapor storage canister. As such, the effect of the fuel vapor storage canister buffer is to dampen any fuel vapor spikes flowing from the fuel tank to the fuel vapor storage canister, thereby reducing the possibility of any fuel vapor spikes being purged to the engine.

Fuel vapor storage canister 222 includes a vent 227 for routing gases out of the fuel vapor storage canister 222 to the atmosphere when storing fuel vapors from fuel tank 220. Vent 227 may also allow fresh air to be drawn into fuel vapor storage canister 222 when purging stored fuel vapors to intake manifold 146 via purge line 228 and CPV 212. While this example shows vent 227 communicating with fresh, unheated air, various modifications may also be used.

In another example, fresh air may be drawn into evaporative emissions system 219 by a pump 238 included in vent 227. Pump 238 may be used in either vacuum or positive pressure modes to produce a predetermined pressure within evaporative emissions system 219 to perform various evaporative emissions system diagnostic tests. For example, pump 238 may be included in an evaporative leak check module (ELCM) 240 coupled to fuel system 8. ELCM 240 also includes a pressure sensor 239 and a reference orifice. As will be described herein with respect to FIGS. 3A and 3B, pump 238 may be used in the negative pressure mode (e.g., vacuum mode) to generate vacuum in fuel tank 220 during an engine auto-stop. However, in other examples, ELCM 240 may not be included in evaporative emissions system 219.

Vent 227 may include a canister vent valve (CVV) 214 to adjust a flow of air and vapors between fuel vapor storage canister 222 and the atmosphere. When included, the vent valve may be a normally open valve so that air, stripped of fuel vapor after having passed through the fuel vapor storage canister, can be pushed out to the atmosphere (for example, during refueling while the engine is off). Likewise, during purging operations (for example, during fuel vapor storage canister regeneration and while the engine is running), the fuel vapor storage canister vent valve may be maintained open to allow a flow of fresh air to strip the fuel vapors stored in the fuel vapor storage canister. In one example, canister vent valve 214 may be a two-state solenoid-actuated valve, wherein opening or closing of the valve is performed via actuation of an associated canister vent solenoid. In particular, CVV 214 may be held open (e.g., fully open) while the associated solenoid is deactivated (e.g., de-energized) and may be commanded closed (e.g., fully closed) by activating (e.g., energizing) the solenoid.

Evaporative emissions system 219 may further include a plurality of bleed canisters 211a, 211b, and 211c included in vent 227 between fuel vapor storage canister 222 and CVV 214. Hydrocarbons that desorb from fuel vapor storage canister 222 (hereinafter also referred to as the "main fuel vapor storage canister") may be adsorbed within the bleed canisters. Bleed canisters 211a, 211b, and 211c may include an adsorbent 280b that is different than the adsorbent material included in main fuel vapor storage canister 222. Alternatively, adsorbent 280b in bleed canisters 211a, 211b, and 211c may be the same as that included in main fuel vapor storage canister 222. Although only three bleed canisters are shown, evaporative emissions system 219 may include more or fewer bleed canisters coupled between fuel vapor storage canister 222 and CVV 214 in vent 227.

A hydrocarbon (HC) sensor 213 may be included in evaporative emissions system 219 to indicate a concentration of hydrocarbons in vent 227. As illustrated, hydrocarbon sensor 213 is positioned between main fuel vapor storage canister 222 and bleed canister 211. A probe (e.g., sensing element) of hydrocarbon sensor 213 is exposed to and senses the hydrocarbon concentration of fluid flow in vent 227. Hydrocarbon sensor 213 may be used by controller 12 for determining breakthrough of hydrocarbon vapors from main fuel vapor storage canister 222, in one example.

One or more temperature sensors 215 may be coupled to and/or within fuel vapor storage canister 222. As fuel vapor is adsorbed by the adsorbent in the fuel vapor storage canister, heat is generated (heat of adsorption). Likewise, as fuel vapor is desorbed by the adsorbent in the fuel vapor storage canister, heat is consumed. In this way, the adsorption and desorption of fuel vapor by the fuel vapor storage canister may be monitored and estimated based on temperature changes within the fuel vapor storage canister, which may be used to estimate canister load. Further, one or more canister heating elements 216 may be coupled to and/or within fuel vapor storage canister 222. Canister heating element 216 may be used to selectively heat the fuel vapor storage canister (and the adsorbent contained within) for example, to increase desorption of fuel vapors prior to performing a purge operation. Canister heating element 216 may comprise an electric heating element, such as a conductive metal, ceramic, or carbon element that may be heated electrically. In some examples, canister heating element 216 may comprise a source of microwave energy or may comprise a fuel vapor storage canister jacket coupled to a source of hot air or hot water. Canister heating element 216 may be coupled to one or more heat exchangers that may facilitate the transfer of heat, (e.g., from hot exhaust) to fuel vapor storage canister 222. Canister heating element 216 may be configured to heat air within fuel vapor storage canister 222 and/or to directly heat the adsorbent located within fuel vapor storage canister 222. In some embodiments, canister heating element 216 may be included in a heater compartment coupled to the interior or exterior of fuel vapor storage canister 222. In some embodiments, fuel vapor storage canister 222 may be coupled to one or more cooling circuits and/or cooling fans. In this way, fuel vapor storage canister 222 may be selectively cooled to increase adsorption of fuel vapors (e.g., prior to a refueling event). In some examples, canister heating element 216 may comprise one or more Peltier elements, which may be configured to selectively heat or cool fuel vapor storage canister 222.

One or more pressure sensors may be coupled to fuel system 8 and evaporative emissions system 219 for providing an estimate of a fuel system and an evaporative emissions system pressure, respectively. In the example illustrated in FIG. 2, a pressure sensor 223 is coupled to conduit 231 between fuel tank 220 and fuel vapor storage canister 222. In alternative examples, pressure sensor 223 may be a fuel tank pressure transducer (FTPT) coupled directly to fuel tank 220 for measuring a pressure of fuel system 8. In other examples, pressure sensor 223 may be coupled to fuel vapor storage canister. In still other examples, more than one pressure sensor may be included, such as a first pressure sensor coupled to fuel tank 220 and a second pressure sensor coupled to fuel vapor storage canister 222, such as where a vapor blocking valve is included in conduit 231 between fuel vapor storage canister 222 and fuel tank 220. In some examples, controller 12 may infer and indicate undesired evaporative emissions (e.g., undesired hydrocarbon emissions) based on changes in an evaporative emissions system pressure during a diagnostic test.

One or more temperature sensors 217 may also be coupled to fuel system 8 for providing an estimate of a fuel system temperature. In one example, the fuel system temperature is a fuel tank temperature, wherein temperature sensor 217 is a fuel tank temperature sensor coupled to fuel tank 220. While the depicted example shows temperature sensor 217 directly coupled to fuel tank 220, in alternate embodiments, the temperature sensor may be coupled between fuel tank 220 and fuel vapor storage canister 222.

Fuel vapors released from fuel vapor storage canister 222, such as during a purging operation, may be directed into intake manifold 146 via purge line 228. The flow of vapors along purge line 228 may be regulated by canister purge valve 212. The quantity and rate of vapors released by the fuel vapor storage canister purge valve may be determined by the duty cycle of the associated canister purge valve solenoid. As such, the duty cycle of the canister purge valve solenoid may be determined by controller 12 responsive to engine operating conditions, including, for example, engine speed-load conditions, an air-fuel ratio, a fuel vapor storage canister load, etc. By closing the canister purge valve (e.g., by deactivating the associated solenoid), the controller may seal the fuel vapor recovery system from the engine intake. An optional canister check valve (not shown) may be included in purge line 228 to prevent intake manifold pressure from flowing gases in the opposite direction of the purge flow. As such, the check valve may be beneficial if the canister purge valve control is not accurately timed or the canister purge valve itself can be forced open by a high intake manifold pressure.

Fuel system 8 and evaporative emissions system 219 may be operated by controller 12 in a plurality of modes by selectively adjusting the various valves and solenoids. As an example, the fuel system and the evaporative emissions system may be operated in a fuel vapor storage mode, wherein controller 12 may maintain canister purge valve 212 closed and maintain canister vent valve 214 open. With the fuel system and the evaporative emissions system coupled to atmosphere via the open canister vent valve 214 and isolated from the intake manifold via the closed canister purge valve 212, fuel vapors may be directed to fuel vapor storage canister 222 from fuel tank 220 via conduit 231. As another example, the fuel system and the evaporative emissions system may be operated in a fuel vapor storage canister purging mode (e.g., after an emission control device light-off temperature has been attained and with the engine running), wherein controller 12 may open canister purge valve 212 while maintaining canister vent valve 214 open. The vacuum generated through natural engine aspiration may be used to draw fresh air through vent 227 and through fuel vapor storage canister 222 to purge the stored fuel vapors into intake manifold 146. In this mode, the purged fuel vapors from the fuel vapor storage canister are combusted in the engine. The purging may be continued until the stored fuel vapor amount in the fuel vapor storage canister is below a threshold, for example.

During purging, the learned vapor amount/concentration may be used to determine the amount of fuel vapors stored in the fuel vapor storage canister, and then during a later portion of the purging operation (when the fuel vapor storage canister is sufficiently purged or empty), the learned vapor amount/concentration may be used to estimate a loading state of the fuel vapor storage canister. For example, one or more oxygen sensors (not shown) may be coupled to the fuel vapor storage canister 222 (e.g., downstream of the fuel vapor storage canister) or positioned in the engine intake and/or engine exhaust to provide an estimate of a fuel vapor storage canister load (that is, an amount of fuel vapors stored in the fuel vapor storage canister). Based on the fuel vapor storage canister load and further based on engine operating conditions, such as engine speed-load conditions, a purge flow rate may be determined.

Further, there are two potential flow paths that may contribute to the purge flow: a first flow path (e.g., flow path 1), which draws vapors from vapor space 204, through conduit 231, and through buffer 222a to purge line 228; and a second flow path (e.g., flow path 2), which draws vapors from the atmosphere (via the open CVV 214), through bleed canisters 211, and through fuel vapor storage canister 222 to purge line 228. Thus, the first flow path fluidically couples fuel tank 220 to intake manifold 146, and the second flow path fluidically couples fuel vapor storage canister 222 to intake manifold 146. A relative amount of purge flow from each flow path varies based on a relative restriction of each path (or a pressure difference across CPV 212 for each path), as will be further described below. For example, when the first flow path is less restrictive than the second flow path (e.g., a pressure difference between intake manifold 146 and vapor space 204 is greater than a pressure difference between intake manifold 146 and fuel vapor storage canister 222), proportionally more vapors flow from vapor space 204 via the first flow path than from fuel vapor storage canister 222 via the second flow path. In contrast, when the second flow path is less restrictive than the first flow path (e.g., the pressure difference between intake manifold 146 and fuel vapor storage canister 222 is greater than the pressure difference between intake manifold 146 and vapor space 204), proportionally more vapors flow from fuel vapor storage canister 222 via the second flow path than from vapor space 204 via the first flow path.

Controller 12 may be included in a control system 141. Controller 12 is shown receiving information from a plurality of sensors 16 (various examples of which are described herein) and sending control signals to a plurality of actuators 81 (various examples of which are described herein). As one example, sensors 16 may include exhaust gas sensor 126, MAP sensor 124, exhaust temperature sensor 158, fuel level sensor 282, pressure sensor 223, hydrocarbon sensor 213, temperature sensor 215, temperature sensor 217, and MAF sensor 122. Other sensors, such as additional pressure, temperature, air/fuel ratio, humidity, and composition sensors, may be coupled to various locations in engine system 100. The actuators 81 may include, for example, throttle 162, fuel pump 234, fuel injector 166, canister heating element 216, CPV 212, CVV 214, and pump 238.

Control system 141 may be communicatively coupled to other vehicles or infrastructures using appropriate communications technology. For example, control system 141 may be coupled to other vehicles or infrastructures via a wireless network 131, which may comprise Wi-Fi, Bluetooth, a type of cellular service, a wireless data transfer protocol, and so on. Control system 141 may broadcast and receive information (e.g., via controller 12) regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. Information exchanged between vehicles can be either directly communicated between vehicles or can be multi-hop. In some examples, longer range communications (e.g. WiMax) may be used in place of or in conjunction with V2V or V2I2V to extend the coverage area by a few miles. In still other examples, vehicle control system 141 may be communicatively coupled to other vehicles or infrastructures via wireless network 131 and the Internet (e.g. the Cloud).

Furthermore, control system 141 may include a stop-start system. The stop-start system may comprise a stop-start controller 102 configured to determine when to shut down and restart engine 10 and to control the engine accordingly, such as when a pre-determined stop-start (e.g., idle-stop) condition is satisfied. Stop-start controller 102 may be a dedicated controller of the stop-start system that is communicatively coupled to controller 12. Alternatively, stop-start controller 102 may be omitted, and controller 12 may be configured to determine when to shut down and restart engine 10, for example. In still other examples, controller 102 may be included in another engine control unit or powertrain control module that is communicatively coupled to controller 12.

Controller 12 may receive input data from the various sensors of FIGS. 1-2, process the input data, and employ the various actuators of FIGS. 1-2 to adjust engine operation based on the received signals and instructions stored on a memory of the controller. The controller may employ the actuators in response to the processed input data based on instruction or code programmed therein corresponding to one or more routines, such as the control routine described herein with regard to FIGS. 3A-3B. As an example, vehicle 5 may have reduced engine operation time due to the vehicle being powered by engine system 100 during some conditions and by electric machine 52 (as shown in FIG. 1) in other conditions (such as when vehicle 5 is a hybrid vehicle) or due to the engine shutting down when the vehicle is on and at rest (such as when vehicle 5 is a stop-start vehicle). While the reduced engine operation times reduce overall carbon emissions from the vehicle, they may also lead to insufficient purging of fuel vapors from evaporative emissions system 219.

For example, when the engine is shutdown, vacuum generated in the fuel tank while the engine was running is lost as the fuel tank equalizes with atmospheric pressure through the open canister vent valve. Without vacuum in the fuel tank, the first flow path becomes less restrictive than the second flow path, particularly when multiple bleed canisters are included in the vent path. As a result, the fuel tank may be evacuated during a purge attempt upon engine restart. The second flow path, which is vented to atmosphere via the open canister vent valve, may become the least resistive purge path once enough vacuum builds in the fuel tank. However, it may take a variable amount of time to re-establish vacuum in the fuel tank based on a size of the fuel tank and a fuel level in the fuel tank, and in some examples, the engine may be shut down again before the fuel vapor storage canister is completely purged.

Figure 3A:
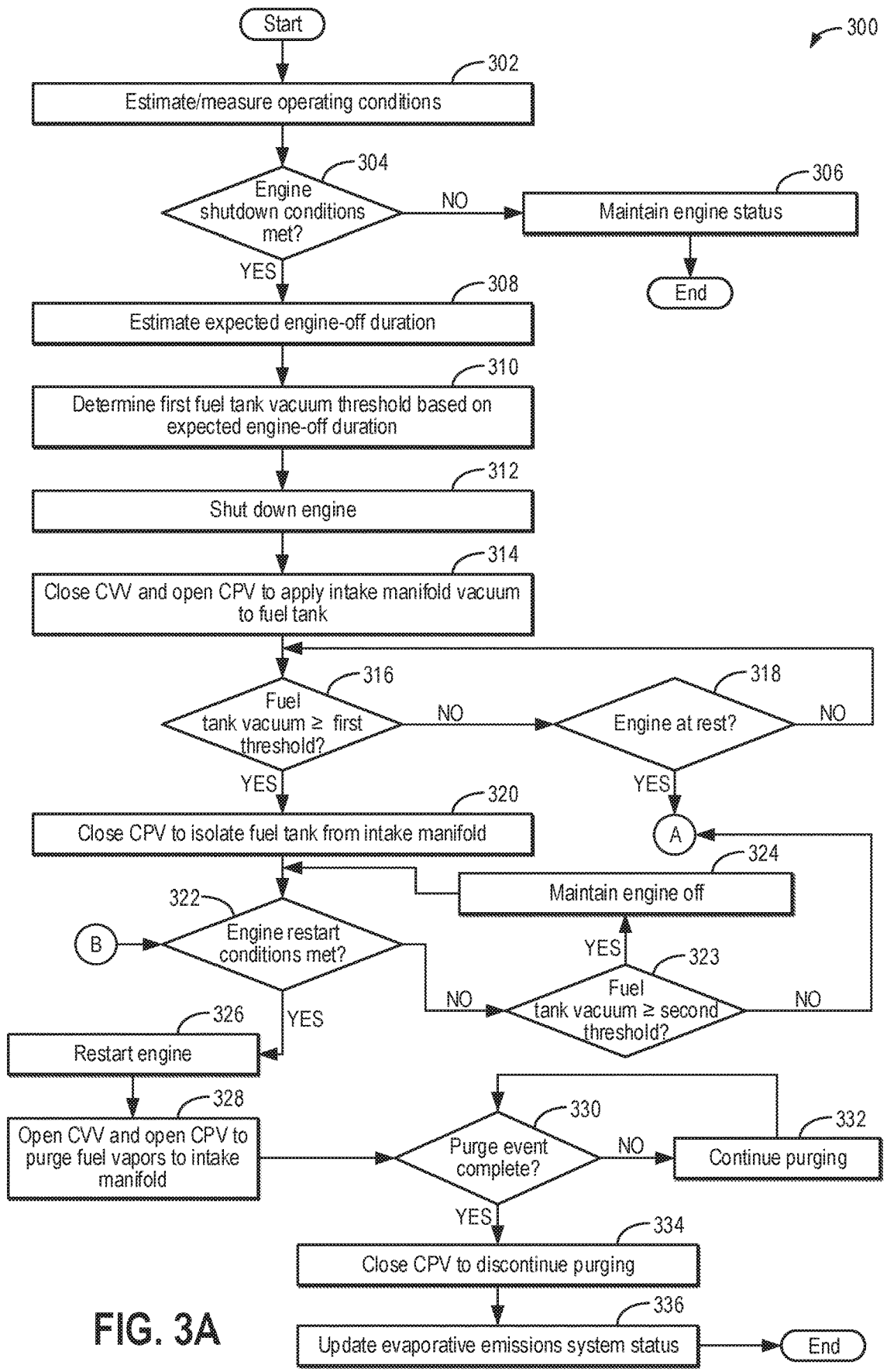
FIGS. 3A and 3B show a flow chart of an example method for generating and holding vacuum in a fuel tank during an engine auto-stop and purging a fuel vapor storage canister upon engine restart.
Figure 3B:
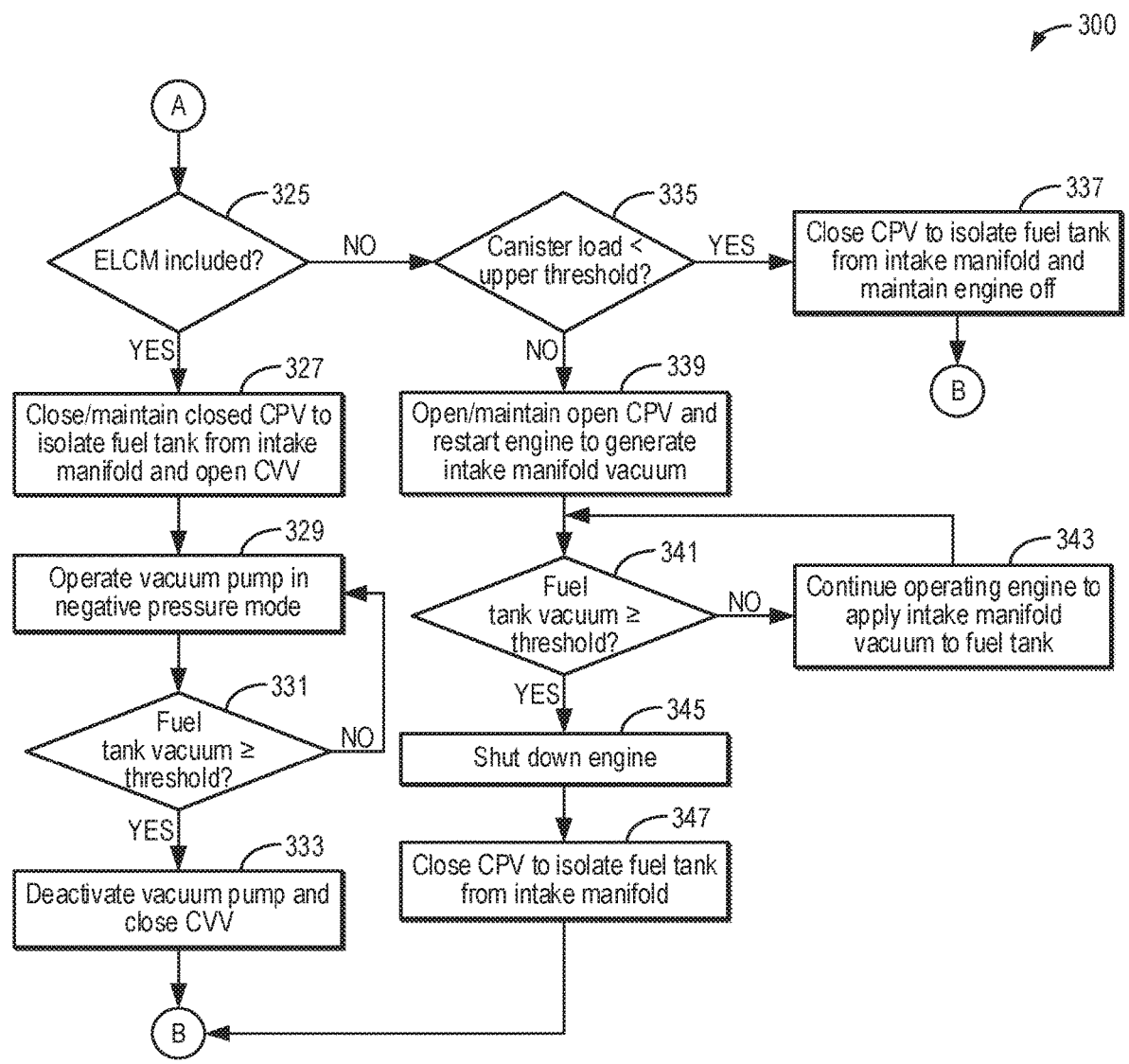

Therefore, FIGS. 3A and 3B shows an example method 300 for purging a fuel vapor storage canister included in an evaporative emissions system of a stop-start or hybrid vehicle (e.g., vehicle 5 shown in FIGS. 1 and 2). For example, method 300 may include generating and trapping vacuum in a fuel tank of a fuel system during an engine shut down so that the fuel vapor storage canister can be efficiently purged upon engine restart. In particular, method 300 may be performed in a stop-start or hybrid vehicle that does not include a vapor blocking valve coupled between the fuel tank and the fuel vapor storage canister. However, in other examples, method 300 may be performed in a stop-start or hybrid vehicle that includes a vapor blocking valve that is degraded and stuck open. Instructions for carrying out method 300 and the rest of the methods included herein may be executed by a controller (e.g., controller 12 of FIGS. 1 and 2) based on instructions stored on a memory of the controller and in conjunction with signals received from sensors of the engine system, such as the sensors described above with reference to FIGS. 1 and 2 (e.g., pressure sensor 223 of FIG. 2). The controller may employ engine actuators of the engine system (e.g., pump 238 of FIG. 2) to adjust engine operation according to the methods described below.

At 302, method 300 includes estimating and/or measuring operating conditions. Operating conditions may include, for example, vehicle speed, a state of charge (SOC) of a system battery (e.g., system battery 58 of FIG. 1), engine status (e.g., "on," with combustion occurring in engine cylinders, or "off," with combustion discontinued), engine load, engine temperature, engine speed, driver-demanded torque, etc. The operating conditions may be measured or inferred based on available data. For example, the SOC may be inferred as a percentage charge of a total charge capacity.

At 304, it is determined if engine shutdown conditions are met. For example, an engine shutdown may be requested for an idle-stop, wherein the engine is shut down while the vehicle remains on and at rest. As another example, the engine shutdown may be requested to transition the vehicle from operating in an engine mode (where torque to propel the vehicle is at least partially provided by the engine) to operating in an electric mode (where torque to propel the vehicle is provided by an electric machine, such as electric machine 52 shown in FIG. 1, and not by the engine). The engine shutdown conditions may include, for example, the battery SOC being above a threshold SOC and the driver-demanded torque being less than a threshold torque. For example, the threshold SOC may be a battery charge level below which the battery may not be able to support or execute additional vehicle functions while the engine is off and/or may be unable to restart the engine. As one non-limiting example, the threshold SOC is 30%. The threshold torque may vary based on whether the engine shutdown is requested for an idle-stop or for transitioning to the electric mode of operation. For example, the threshold torque may be a positive, non-zero amount of driver-demanded torque that the electric machine is able to meet and/or sustain when the engine shutdown is requested for transitioning to the electric mode of operation. The electric machine may not be able to meet or sustain torque levels above the threshold torque, for example. In contrast, the threshold torque may be lower when the engine shutdown is requested for an idle-stop, such as a torque amount corresponding to a neutral (e.g., undepressed) accelerator pedal position.

As another example, the engine shutdown conditions may additionally or alternatively include the vehicle speed being less than a threshold speed. Similar to the threshold torque, the threshold speed may vary based on whether the engine shutdown is requested for an idle-stop or for transitioning to the electric mode of operation. For example, the threshold vehicle speed may be lower (e.g., in a range from 1-5 mph) when the engine shutdown is request for an idle-stop and higher (e.g., in a range from 20-40 mph) when the engine shutdown is requested for transitioning to the electric mode of operation. As still another example, the engine shutdown conditions may include the engine idling for longer than a threshold duration, such as when the engine shutdown is requested for an idle-stop. The threshold duration refers to a non-zero time duration, such as a duration in a range from 1-10 seconds. The engine shut down conditions may further include the engine currently being on (and not already off).

All of the engine shutdown conditions for the corresponding shutdown request (e.g., idle-stop or transition to electric mode) may be confirmed for an engine shutdown to be initiated. Shutting down the engine both for an idle-stop and for transitioning to the electric mode of operation may be referred to herein as an engine auto-stop, as the engine is shut down automatically by the controller and without a request from the driver.

If the engine shutdown conditions are not met (e.g., one of the engine shutdown conditions is not met), method 300 proceeds to 306 and includes maintaining the engine status. For example, if the engine is on, fuel and spark will continue to be provided to the engine cylinders to produce combustion torque. If the engine is off, fuel and spark will remain disabled so that combustion does not occur in the engine cylinders. Following 306, method 300 ends.

Returning to 304, if the engine shutdown conditions are met, method 300 proceeds to 308 and includes estimating an expected engine-off duration. The controller may estimate the expected engine-off duration based on communications received from other vehicles and/or infrastructure (e.g., as received via a wireless network, such as wireless network 131 shown in FIG. 2). The controller may additionally or alternatively estimate the expected engine-off duration based on the operating conditions, such as the battery SOC. As an illustrative example, when the vehicle is stopped at a red light, data communicated by infrastructure (e.g., via V2I and/or V2X technologies) may include an amount of time remaining before the light turns green. The controller may then estimate the expected engine-off duration as at least the amount of time remaining before the light turns green. As another illustrative example, when the vehicle is stopped due to a traffic bottleneck, data communicated by other vehicles (e.g., via V2V and/or V2I2V communication networks) may include an amount of time that other vehicles have remained stopped at the bottleneck. The controller may then estimate the expected engine-off duration as at least an average amount of time the other vehicles have remained stopped, for example. As still another illustrative example, the controller may estimate the expected engine-off duration based on an estimated amount of time remaining before the SOC drops below the threshold SOC, thereby triggering an engine restart (as described below). The controller may estimate the amount of time remaining before the SOC drops below the threshold SOC by inputting operating conditions, including the driver-demanded torque and additional electrical loads on the battery, into one or more a look-up tables, algorithms, or maps, for example.

At 310, method 300 includes determining a first fuel tank vacuum threshold based on the expected engine-off duration (e.g., as estimated at 308). An amount of vacuum in the fuel tank (also referred to as "fuel tank vacuum") will naturally decay over time due to fuel vaporization, heating, etc. Therefore, the first fuel tank vacuum threshold may be greater (e.g., a greater amount of vacuum or negative pressure) when the expected engine-off duration is longer in order to maintain vacuum in the fuel tank that is at or above a second fuel tank vacuum threshold over the entire estimated engine-off duration. The second fuel tank vacuum threshold may be a non-zero pre-determined amount of vacuum that is less than the first fuel tank vacuum threshold and corresponds to a minimum fuel tank vacuum for conveying a primary purge flow from the evaporative emissions system to the intake manifold upon engine restart, as will be further described below. For example, the second fuel tank vacuum threshold may be in a range from −4 $inH_2O$ (e.g., when a single fuel vapor storage canister is included in the evaporative emissions system) to −8 $inH_2O$ (e.g., when multiple fuel vapor storage canisters are connected in series, such a main canister and one or more bleed canisters). Conversely, the first fuel tank vacuum threshold may be lower (e.g., a lower amount of vacuum or negative pressure), but still higher than the second fuel tank vacuum threshold, when the expected engine-off duration is lower, as there will be less time for vacuum loss due to the natural decay. As an example, the controller may input the expected engine-off duration into a look-up table that is stored on a memory of the controller, which may output the corresponding first fuel tank vacuum threshold for the input duration.

As another example, additionally or alternatively, the controller may adjust a pre-calibrated fuel tank vacuum threshold based on the expected engine-off duration. For example, the pre-calibrated fuel tank vacuum threshold may correspond to an amount of vacuum that results in the fuel tank vacuum remaining above the second fuel tank vacuum threshold for a first set duration that corresponds to a moderate engine-off duration (e.g., 30 seconds). The controller may proportionally decrease the first fuel tank vacuum threshold from the pre-calibrated fuel tank vacuum threshold as the expected engine-off duration decreases below the set duration and proportionally increase the first fuel tank vacuum threshold from the pre-calibrated fuel tank vacuum threshold as the expected engine-off duration increases above the set duration.

As still another example, additionally or alternatively, the first fuel tank vacuum threshold may not exceed a maximum value (e.g., approximately 10 $inH_2O$ of vacuum). The maximum value may vary based on the fuel tank. For example, fuel tanks with internal support structures (e.g., standoffs, flowerpots, saddle tanks) are inherently stiffer, enabling deeper vacuum levels to be achieved. Studies performed during a fuel tank design phase to quantify tank stiffness may be used to calibrate the maximum value for each particular fuel tank, for example. Thus, in some examples, the controller may adjust the first fuel tank vacuum threshold from the maximum value, such as by proportionally decreasing the first fuel tank vacuum threshold from the maximum value as the expected duration decreases below a second set duration that corresponds to a long engine-off duration (e.g., 5 minutes). As such, the first fuel tank vacuum threshold may be the same for expected engine-off durations that are greater than or equal to the second set duration and may not be increased above the maximum value.

At 312, method 300 includes shutting down (e.g., pulling down) the engine. For example, during the engine pull down, the engine is spun, unfueled, to rest (e.g., zero speed). Cylinder combustion is discontinued, but intake and exhaust valves may remain active until the engine is at rest. As such, prior to the pull down, the engine may be combusting fuel and spinning at a non-zero engine speed, and then during the pull down, combustion of fuel in the engine is discontinued and the engine is spun down to rest. In examples where the engine shutdown is requested to transition the vehicle to the electric mode of operation, the shutting down the engine may include discontinuing fuel delivery to the engine cylinders while propelling the vehicle using electric torque from the electric machine, which is driven using power from the system battery. Additionally, the engine may be shut down and spun down to rest without receiving input from the vehicle operator and without a change in the vehicle state or the state of an ignition key. Further, spark may be disabled as the engine is shut down. By enabling engine auto-stop when the engine shutdown conditions are met, fuel economy may be increased and vehicle emissions may be reduced.

At 314, method 300 includes closing a canister vent valve and opening a canister purge valve to apply intake manifold vacuum to the fuel tank. For example, the canister vent valve (e.g., CVV 214 of FIG. 2) may be a normally open valve included in a vent that fluidically couples the evaporative emissions system, and thereby the fuel system, to atmosphere. By commanding closed the canister vent valve (e.g., by activating an associated canister vent solenoid), the evaporative emissions system and the fuel system may be sealed from the atmosphere. Further, the canister purge valve (e.g., CPV 212 of FIG. 2) may be a normally closed valve included in a purge line that fluidically couples the evaporative emissions system, and thereby the fuel system, to an intake manifold of the engine (e.g., intake manifold 146 of FIGS. 1 and 2). By commanding open the canister purge valve (e.g., by activating an associated canister purge solenoid), the evaporative emissions system and the fuel system may be fluidically coupled to the intake manifold.

As the engine spins to rest, pistons within engine cylinders continue to reciprocate, generating vacuum in the intake manifold (e.g., intake manifold vacuum) that may be transmitted to the evaporative emissions system and the fuel system via the open canister purge valve. In particular, the intake manifold vacuum may draw vacuum on the fuel tank over the evaporative emissions system while the amount of vacuum (e.g., negative pressure) in the fuel tank is relatively low (e.g., less than the second fuel tank vacuum threshold) because a flow path from the fuel tank is less restrictive than a flow path from the evaporative emissions system, which includes the fuel vapor storage canister and one or more bleed canisters that are tightly packed with adsorbent. Further, with the canister vent valve closed, fresh air may not be drawn in through the vent and across the fuel vapor storage canister. Thus, during the engine shutdown, a primary flow of gases flowing to the intake manifold via the purge line and the open canister purge valve originates from the fuel tank (e.g., via flow path 1, as labeled in FIG. 2) relative to the fuel vapor storage canister (e.g., via flow path 2, as labeled in FIG. 2).

At 316, method 300 includes determining if the fuel tank vacuum is greater than or equal to the first fuel tank vacuum threshold (e.g., as determined at 310). For example, the amount of fuel tank vacuum may be determined based on output from a fuel system pressure sensor (e.g., pressure sensor 223 of FIG. 2). If the fuel tank vacuum is not greater than or equal to the first fuel tank vacuum threshold (e.g., the fuel tank vacuum is less than the first fuel tank vacuum threshold), method 300 proceeds to 318 to determine if the engine is at rest (e.g., a speed of zero). If the engine is not at rest, such as when the engine is still spinning down and continuing to generate intake manifold vacuum, method 300 may return to 316. For example, the canister purge valve may be maintained open as the engine spins down so that the intake manifold vacuum continues to be communicated to the fuel tank to increase the fuel tank vacuum until the fuel tank vacuum reaches the first, higher fuel tank vacuum threshold or until the engine reaches a speed of zero.

If the engine is at rest at 318, such as when the engine speed reaches zero before the first fuel tank vacuum threshold is achieved, method 300 proceeds to 325 (shown in FIG. 3B), as will be described below. For example, the fuel tank vacuum may not reach the first fuel tank vacuum threshold prior to the engine speed reaching zero when the first fuel tank vacuum threshold is high, the intake manifold vacuum is shallow, the fuel tank is large, and/or the fuel tank vapor space is large (e.g., a fuel level of the fuel tank is low).

If instead the fuel tank vacuum is greater than or equal to the first fuel tank vacuum threshold at 316, method 300 proceeds to 320 and includes closing the canister purge valve to isolate the fuel tank from the intake manifold. That is, responsive to the amount of vacuum in the fuel tank reaching the first fuel tank vacuum threshold (as determined based on the expected engine-off duration), the controller closes the canister purge valve, such as by deactivating the associated canister purge solenoid. For example, the intake manifold may be coupled to atmosphere (e.g., via a throttle and/or via cylinder intake or exhaust valves), and so the manifold vacuum may quickly decay once the engine spins down to rest to equilibrate with atmospheric pressure. Further, the canister vent valve may be maintained closed, such as by continuing to energize the associated canister vent solenoid. With the evaporative emissions system and fuel system sealed from the atmosphere via the closed canister vent valve and the closed canister purge valve, the fuel tank vacuum may decay more slowly.

At 322, it is determined if engine restart conditions are met. The engine restart conditions may include, for example, the driver-demanded torque increasing above the threshold torque (as defined above at 304), such as due to the driver tipping in, or the battery SOC dropping below the threshold SOC (as also defined above at 304). In some examples, any or all of the engine restart conditions may be confirmed for an engine restart to be initiated. Restarting the engine both after an idle-stop and for transitioning to the engine mode of operation may be referred to herein as an engine auto-start, as the engine is restarted automatically by the controller and without a request from the driver.

If the engine restart conditions are not met, method 300 proceeds to 323 and includes determining if the fuel tank vacuum is greater than or equal to the second, lower fuel tank vacuum threshold. As discussed above, the fuel tank vacuum may naturally decay while the engine is off, and at fuel tank vacuum levels above the second fuel tank vacuum threshold, the fuel tank may provide a less restrictive vapor flow path than the fuel vapor storage canister during purging upon engine restart. If the fuel tank vacuum is greater than or equal to second fuel tank vacuum threshold, method 300 proceeds to 324 and includes maintaining the engine off. The engine will remain at rest, without fuel supplied to the engine and without combustion occurring within the engine cylinders. Method 300 may then return to 322. If instead the fuel tank vacuum is not greater than or equal to the second fuel tank vacuum threshold (e.g., the fuel tank vacuum is less than the second fuel tank vacuum threshold), method 300 proceeds to 325. Thus, method 300 may proceed to 325 both when the first fuel tank vacuum threshold is not achieved during engine pull down (e.g., from 318) and when the fuel tank vacuum is not maintained above the second fuel tank vacuum threshold (e.g., from 323).

At 325, method includes determining if the vehicle includes an ELCM (e.g., ELCM 240 shown in FIG. 2). A vacuum pump of the ELCM (e.g., vacuum pump 238 of FIG. 2) may provide an additional vacuum source for evacuating the fuel tank and/or maintaining the fuel tank vacuum below the second fuel tank vacuum threshold.

If the ELCM is included, method 300 proceeds to 327 and includes closing/maintaining closed the canister purge valve to isolate the fuel tank from the intake manifold and opening the canister vent valve. For example, when the first fuel tank vacuum threshold has not been achieved using manifold vacuum (e.g., as determined at 316 and 318), the canister purge valve is closed, such as by de-energizing the associated canister purge solenoid. As another example, when the fuel tank vacuum has not remained below the second fuel tank vacuum threshold while the engine is auto-stopped, such as due to a long auto-stop event and/or due to hot fuel vaporizing to refill the vapor space, the canister purge valve is maintained closed by maintaining the associated canister purge solenoid deactivated. The canister vent valve may be commanded open from the closed position by de-energizing the associated canister vent solenoid.

At 329, method 300 includes operating the vacuum pump in a negative pressure mode in order to pump gas (e.g., air stripped of fuel vapors) out of the evaporative emissions system via the vent and the open canister vent valve. Activating the ELCM vacuum pump may include supplying electrical power to the vacuum pump, with the amount of electrical power supplied to the vacuum pump determined based on a desired vacuum generation rate. For example, the controller may input the desired vacuum generation rate into a look-up table stored in memory, which may output an amount (or duty cycle) of electrical power to supply to vacuum pump. Further, the desired vacuum generation rate may be a predetermined value or may be determined based on vehicle operating conditions, such as ambient temperature and the fuel tank pressure. For example, the controller may input the ambient temperature and the fuel tank pressure into a look-up table stored in memory, which may output the desired vacuum generation rate.

At 331, method 300 includes determining if the fuel tank vacuum is greater than or equal to a fuel tank vacuum threshold. In one example, such as when the vacuum pump is activated to supplement the fuel tank vacuum generated during engine spin down, the fuel tank vacuum threshold is the first fuel tank vacuum threshold (e.g., as determined at 310). As another example, the first fuel tank vacuum threshold is adjusted based on a remaining expected engine off duration when the fuel tank vacuum has decayed above the second fuel tank vacuum threshold. As still another example, the fuel tank vacuum threshold at 331 is a third fuel tank vacuum threshold that is greater than (e.g., a more negative pressure than) the second fuel tank vacuum threshold but different than the first fuel tank vacuum threshold, such as when the vacuum pump is activated due to fuel tank vacuum decay while the engine is off. For example, the third fuel tank vacuum threshold may be greater than the second fuel tank vacuum threshold by a pre-determined amount to allow for additional vacuum decay prior to the engine restart.

If the fuel tank vacuum is not greater than or equal to the fuel tank vacuum threshold (e.g., the fuel tank vacuum is less than the fuel tank vacuum threshold), method 300 may return to 329 to continue operating the vacuum pump in the negative pressure mode to continue evacuating the fuel tank vapor space. If the fuel tank vacuum is greater than or equal to the fuel tank vacuum threshold, method 300 proceeds to 333 and includes deactivating the vacuum pump and closing the canister vent valve. By deactivating the vacuum pump and closing the canister vent valve (e.g., by energizing the associated canister vent solenoid), additional vacuum will not be generated in the fuel tank, and the fuel tank will be isolated from the atmosphere to maintain the fuel tank vacuum. Method 300 may then proceed to 322 to determine if engine restart conditions are met, as described above. Thus, in some examples, such as pro-longed engine auto-stop events, the vacuum pump may be used iteratively in order to maintain the fuel tank vacuum above the second fuel tank vacuum threshold.

Returning to 325, if the vehicle does not include an ELCM (and thus does not include the ELCM pump as the additional vacuum source), the controller may make a determination of whether a fuel economy and emissions penalty of restarting the engine for generating additional intake manifold vacuum outweighs a potential emissions penalty due to incomplete fuel vapor storage canister purging upon engine restart. Specifically, method 300 proceeds to 335 and includes determining if a load of the fuel vapor storage canister is less than an upper threshold load. For example, the upper threshold load may refer to a canister load above which the fuel vapor storage canister may be unable to store a substantial amount of additional vapors. For example, the adsorbent of the fuel vapor storage canister may be approaching capacity. The upper threshold load may be calibrated such that the potential emissions penalty of incompletely purging the fuel vapor storage canister outweighs the fuel economy and emissions penalty of restarting the engine when the canister load is greater than or equal to the upper threshold load and the fuel economy and emissions penalty of restarting the engine outweighs the potential emissions penalty of incompletely purging the fuel vapor storage canister when the canister load is less than the upper threshold load.

If the fuel vapor storage canister load is less than the upper threshold load, method 300 proceeds to 337 and includes closing the canister purge valve to isolate the fuel tank from the intake manifold, as described above at 320, and maintaining the engine off. Thus, the engine will not be restarted for generated additional fuel tank vacuum. If instead the fuel vapor storage canister load is not less than the upper threshold load (e.g., the fuel vapor storage canister load is greater than or equal to the upper threshold load), method 300 proceeds to 339 and includes opening/maintaining open the canister purge valve and restarting the engine to generate intake manifold vacuum. For example, if the canister purge valve is already open, such as when the first fuel tank vacuum threshold has not been achieved during the engine pull down (e.g., as determined at 316 and 318), the canister purge valve is maintained open by continuing to energize the associated canister purge solenoid. As another example, if the canister purge valve is closed, such as when the fuel tank vacuum has decayed below the second fuel tank vacuum threshold during the engine auto-stop (e.g., as determined at 323), the canister purge valve is commanded open from the closed position by energizing the associated canister purge solenoid. Restarting the engine may include, for example, cranking the engine to a non-zero speed with the electric motor or a starter motor, initiating fuel delivery to the engine cylinders, operating intake and exhaust valves of each cylinder to provide fresh air for combustion and to exhaust combusted gas, respectively, and initiating fuel combustion in the cylinders (e.g., by providing a spark via spark plugs). As one example, the engine may be operated at idle speed. As another example, the engine speed and a throttle position (e.g., of throttle 162 of FIGS. 1 and 2) may be selected to obtain a desired intake manifold vacuum (e.g., as measured by MAP sensor 124 of FIGS. 1 and 2).

At 341, method 300 includes determining if the fuel tank vacuum is greater than or equal to a fuel tank vacuum threshold, as described above at 331. If the fuel tank vacuum is not greater than or equal to the fuel tank vacuum threshold, method 300 proceeds to 343 and includes continuing to operate the engine to apply intake manifold vacuum to the fuel tank. If the fuel tank vacuum is greater than or equal to a fuel tank vacuum threshold, method 300 proceeds to 345 and includes shutting down the engine, as described above at 312. Further, as the engine spins down, manifold vacuum may continue to be applied to the fuel tank via the open canister purge valve.

At 347, method 300 includes closing the canister purge valve to isolate the fuel tank from the intake manifold, as described above at 320. Thus, the fuel tank is sealed from the atmosphere by the closed canister purge valve and the closed canister vent valve (e.g., as closed at 314). Method 300 may then proceed to 322. Thus, in some examples, such as pro-longed engine auto-stop events when the fuel vapor storage canister load is not less than the upper threshold load, the engine may be restarted iteratively in order to maintain the fuel tank vacuum above the second fuel tank vacuum threshold.

Returning to 322, if the engine restart conditions are met, method 300 proceeds to 326 and includes restarting (e.g., pulling up) the engine. Restarting the engine may include, for example, cranking the engine to a non-zero speed with the electric motor or a starter motor, initiating fuel delivery to the engine cylinders, operating intake and exhaust valves of each cylinder to provide fresh air for combustion and to exhaust combusted gas, respectively, and initiating fuel combustion in the cylinders (e.g., by providing a spark via spark plugs). Further, in some examples, restarting the engine may include transitioning from the electric mode of operation to the engine mode of operation, and during the transition, the electric torque output by the electric machine may be adjusted so that the combined torque of the electric machine and the engine achieves the driver-demanded torque as the engine is spun up.

At 328, method 300 includes opening the canister vent valve and opening the canister purge valve to purge fuel vapors to the intake manifold. In particular, if the fuel tank vacuum remains greater than or equal to the second fuel tank vacuum threshold upon canister vent valve and canister purge valve opening, intake manifold vacuum generated from pulling up the engine and applied to the evaporative emissions system and fuel system via the open canister purge valve will result in primarily purging the evaporative emissions system (relative to the fuel system). For example, with the fuel tank vacuum greater than the second fuel tank vacuum threshold, the flow path from the evaporative emissions system, including the vented fuel vapor storage canister and the bleed canisters, is less restrictive than the flow path from the fuel system. That is, a pressure difference across the canister purge valve between the intake manifold and the evaporative emissions system is greater than a pressure difference across the canister purge valve between the intake manifold and the fuel tank, causing the vapors purged to the intake manifold to primarily flow from the evaporative emissions system. In contrast, if the fuel tank vacuum is less than the second fuel tank vacuum threshold upon canister vent valve and canister purge valve opening, the pressure difference across the canister purge valve between the intake manifold and the fuel tank is greater than the pressure difference across the canister purge valve between the intake manifold and the evaporative emissions system, causing the flow path from the fuel system to be less restrictive. As such, the vapors purged to the intake manifold may primarily flow from the fuel system until vacuum is re-established in the fuel tank (e.g., when the fuel tank vacuum reaches or exceeds the second fuel tank vacuum threshold). Purging the fuel vapor storage canister may be less efficient when the fuel tank vacuum decreases below the second fuel tank vacuum threshold while the engine remains off, but may be more efficient compared with venting the fuel tank to atmosphere (e.g., via an open canister vent valve) when the fuel tank pressure remains below atmospheric pressure.

With the canister vent valve and the canister purge valve open, fresh air may be drawn across the fuel vapor storage canister, thus desorbing adsorbed hydrocarbons from the fuel vapor storage canister. Desorbed hydrocarbons may be routed through the open canister purge valve to the engine intake for combustion. Further, method 300 may optionally include monitoring the purge flow. For example, one or more exhaust gas oxygen sensors (e.g., exhaust gas oxygen sensor 126 of FIGS. 1 and 2) may be positioned in the engine exhaust to provide an estimate of the amount of fuel vapors purged to the intake manifold. Alternatively, a sensor coupled to the engine intake may provide an indication of the amount of fuel vapors purged to the engine intake, such as an intake oxygen sensor. Based on the fuel vapor storage canister load, and further based on engine operating conditions, such as engine speed-load conditions, a purge flow rate may be determined.

At 330, method 300 includes determining if the purge event is complete. For example, the purge event may be complete when the load of the fuel vapor storage canister load reaches or decreases below a lower threshold load. The lower threshold load may refer to a fuel vapor storage canister load at which it may be determined that the fuel vapor storage canister is sufficiently clean and able to adsorb more fuel vapors, for example, during subsequent refueling events or due to diurnal and running loss vapors. As another example, the purge event may be considered complete when an engine shutdown is requested even if the fuel vapor storage canister load remains above the threshold load, as additional purged fuel vapors would not be combusted in the engine during pull down.

If it is determined that fuel vapor storage canister purging is not complete, method 300 proceeds to 332 to continue purging the contents of the fuel vapor storage canister to the intake manifold. For example, continuing purging include maintaining the canister purge valve and the canister vent valve open. However, if it is determined that the purging event is complete, method 300 proceeds to 334 and includes closing the canister purge valve to discontinue purging. By closing the canister purge valve (e.g., by deactivating the associated canister purge solenoid), the evaporative emissions system, including the fuel vapor storage canister, and the fuel system, including the fuel tank, may be sealed from the intake manifold. Further, the canister vent valve may remain open, venting the evaporative emissions system and fuel system to atmosphere.

At 336, method 300 includes updating an evaporative emissions system status. For example, updating the evaporative emissions system status may include indicating that the fuel vapor storage canister has been at least partially purged of stored fuel vapors. Further, the evaporative emissions system status may include the fuel vapor storage canister load. The evaporative emissions system status may be stored at the controller, for example. Updating the evaporative emissions system status may additionally include updating a fuel vapor storage canister purge schedule. For example, responsive to the indication that the fuel vapor storage canister load has decreased below the threshold load, a future fuel vapor storage canister purge operation may be postponed or rescheduled. However, in other examples, the controller may be configured to purge the fuel vapor storage canister even when the canister load is relatively low in order to ensure that the adsorbent of the fuel vapor storage canister is not saturated during engine-off. Following 336, method 300 ends.

Thus, in one example, the method of FIGS. 3A and 3B may include determining an engine auto-stop condition, and in response thereto, closing a canister vent valve and opening a canister purge valve of an evaporative emissions system; and determining an engine auto-start condition, and in response thereto, opening the canister vent valve and opening the canister purge valve. Further, the method may include the engine auto-stop condition occurring, operating in the engine auto-stop condition by discontinuing fuel injection to the engine while the vehicle remains on, the engine auto-start condition occurring, and operating in the engine auto-start condition by resuming fuel injection to the engine. Operating in the engine auto-stop condition may further include estimating an expected engine-off duration (e.g., based on data received from a communication network and/or based on a state of charge of a system battery) and using the estimated expected engine-off duration to determine a first threshold vacuum level. Further still, operating in the engine auto-stop condition may include closing the canister purge valve in response to a vacuum level of the fuel tank (e.g., as measured by a pressure sensor coupled to the fuel tank) reaching the first threshold vacuum level. As another example, operating in the engine auto-stop condition may include activating a vacuum pump included in the evaporative emissions system in response to the vacuum level of the fuel tank decreasing below a second threshold vacuum level, which is less than the first threshold vacuum level.

Next, FIG. 4 shows an example timeline 400 for adjusting valves of an evaporative emissions system of a vehicle (e.g., evaporative emissions system 219 of FIG. 2) to pre-charge a fuel tank (e.g., fuel tank 220 of FIG. 2) with vacuum during an engine shutdown for an auto-stop and then further adjusting the valves during an engine restart from the auto-stop to efficiently purge a fuel vapor storage canister of the evaporative emissions system (e.g., fuel vapor storage canister 222 of FIG. 2). In particular, example timeline 400 does not including using an ELCM vacuum pump (e.g., pump 238 of FIG. 2) to generate additional fuel tank vacuum, such as when the vehicle does not include an ELCM. Vehicle status is shown in plot 402, engine status is shown in plot 404, canister purge valve (CPV) position is shown in plot 406, canister vent valve (CVV) position is shown in plot 408, fuel tank pressure is shown in plot 410, a relative flow through the CPV is shown in plot 412, and fuel vapor storage canister load is shown in plot 414.

For all of the above, the horizontal axis represents time, with time increasing along the horizontal axis from left to right. The vertical axis represents each labeled parameter. For plot 402, the vertical axis represents whether the vehicle is on (e.g., with an ignition key in an "on" position) or off (e.g., with the ignition key in an "off" position), as labeled. For plot 404, the vertical axis represents whether the engine is on (e.g., with combustion occurring in engine cylinders) or off (e.g., with no combustion occurring in the engine cylinders), as labeled. For plots 406 and 408, the vertical axis represents whether the CPV and the CVV are open (e.g., fully open) or closed (e.g., fully closed), respectively, as labeled. For plot 410, the vertical axis shows the fuel tank pressure with respect to atmospheric pressure ("Atm"); positive pressure values correspond to pressures above atmospheric pressure, and negative pressure (e.g., vacuum) values correspond to pressures that are less than atmospheric pressure. For plot 412, the vertical axis shows the relative flow through the CPV according to a source of the flow (e.g., the fuel tank or the fuel vapor storage canister, as labeled). For example, above the horizontal axis, a greater proportion of vapors flowing through the CPV flow from the fuel tank, with the proportion from the fuel tank increasing along the vertical axis from bottom to top, and below the horizontal axis, a greater proportion of the vapors flowing through the CPV flow from the fuel vapor storage canister, with the proportion from the fuel vapor storage canister increasing along the vertical axis from top to bottom. Plot 412 is shown in segments, as vapors do not flow through the CPV while the CPV is closed. For plot 414, the magnitude of the canister load increases along the vertical axis from bottom to top.

Prior to time t1, the vehicle is on (plot 402) and the engine is on (plot 404). Thus, the vehicle is operated in an engine mode of operation, in which the engine supplies at least a portion of the torque for propelling the vehicle. The CPV is closed (plot 406), isolating the evaporative emissions system and the fuel system from an intake manifold of the engine, and the CVV is open (plot 408), coupling the evaporative emissions system and the fuel system to atmosphere. With the CPV closed, there is no flow through the CPV (and thus, there is no segment of plot 412 prior to time t1). Further, with the engine on and combusting fuel, a small vacuum is generated in the fuel tank (plot 410).

At time t1, the engine is shut down (plot 404) for an auto-stop while the vehicle remains on (plot 402). For example, the auto-stop may be requested for an idle-stop or to operate the vehicle in an electric mode, as described above with respect to FIGS. 3A and 3B. In response to the auto-stop request, a controller of the vehicle estimates an expected duration d1 for the auto-stop based on data received from vehicle-to-vehicle and vehicle-to-infrastructure networks as well as vehicle operating conditions, including a state of charge of a system battery. The controller then determines a first fuel tank vacuum threshold, represented by dashed line 411, based on the expected duration d1. Further, the controller commands closed the CVV (plot 408) to seal the evaporative emissions system and the fuel system from the atmosphere and commands open the CPV (plot 406) to couple the evaporative emissions system and fuel system to the intake manifold. Intake manifold vacuum, generated from a reciprocating motion of a piston within each engine cylinder as the engine spins down, is applied to the evaporative emissions system and fuel system via a purge line and the open CPV. With the CVV closed, a first flow path coupling the fuel tank to the intake manifold is less restrictive that a second flow path coupling the vapor storage canister to the intake manifold, and gas (e.g., air stripped of fuel vapors by adsorbent in the fuel vapor canister) flows to the intake manifold primarily from the fuel tank (plot segment 412).

An amount of vacuum in the fuel tank increases (e.g., the fuel tank pressure decreases and becomes more negative) as the intake manifold vacuum evacuates the fuel tank, as shown in plot 410. At time t2, the fuel tank pressure reaches the first fuel tank vacuum threshold (dashed line 411). In response, the CPV is commanded closed (plot 406) to isolate the fuel tank from the intake manifold. Further, the CVV is held closed (plot 408) to maintain the fuel tank vacuum. As the engine remains off during the auto-stop, the fuel tank vacuum naturally decays, resulting in the fuel tank pressure (plot 410) increasing (e.g., becoming less negative).

At time t3, the engine is restarted (plot 404) shortly before the expected duration d1 elapses. In response to the engine restart, the CPV and the CVV are commanded open (plots 406 and 408, respectively). Intake manifold vacuum generated from the engine spinning up is applied to the evaporative emissions and fuel system via the purge line and the open CPV. At time t3, the fuel tank pressure remains less than a second fuel tank vacuum threshold represented by dashed line 409 (e.g., the fuel tank vacuum is greater than the second fuel tank vacuum threshold). With the CVV open and the fuel tank pressure less than the second fuel tank vacuum threshold, the fuel vapor storage canister forms a less restrictive flow path than the fuel tank, and gas (e.g., air and desorbed fuel vapors) flows to the intake manifold primarily from the fuel vapor storage canister (plot 412). For example, the intake manifold vacuum pulls fresh air in through a vent and the open CVV, which passes through bleed canisters positioned along the vent and through the fuel vapor storage canister, desorbing fuel vapors from the bleed canisters and the fuel vapor storage canister that are purged to the intake manifold via the purge line and the open CPV.

As the fuel vapor canisters are desorbed and purged, the fuel vapor canister load decreases (plot 414). At time t4, the fuel vapor canister load reaches a lower threshold load represented by dashed line 415, indicating that the purge event is complete. In response, the controller closes the CPV (plot 406) to isolate the evaporative emissions system and the fuel system from the intake manifold. The CVV remains open (plot 408) to couple the evaporative emissions system and the fuel system to the atmosphere. As a result, the fuel tank pressure increases toward atmospheric pressure (plot 410). Further, the fuel vapor storage canister load increases as the engine is operated (plot 414) due to running loss vapors.

At time t5, the engine is shut down (plot 404) for another auto-stop while the vehicle remains on (plot 402). In response to the auto-stop request, a controller of the vehicle estimates an expected duration d2. In particular, the expected duration d2 is a relatively long duration, and the first fuel tank vacuum threshold (dashed line 411) is adjusted to a higher vacuum threshold (e.g., a more negative pressure), which is a maximum vacuum value. The CVV is closed (plot 408) to seal the evaporative emissions system and the fuel system from the atmosphere, and the CPV is opened (plot 406) to couple the evaporative emissions system and the fuel system to the intake manifold. The intake manifold vacuum primarily draws vapors from the fuel tank (plot segment 412), and the fuel tank pressure decreases (plot 410) as vacuum builds in the fuel tank.

At time t6, the fuel tank pressure reaches the first fuel tank vacuum threshold (dashed line 411). In response, the CPV is commanded closed (plot 406) to isolate the fuel tank from the intake manifold, and the CVV is held closed (plot 408) to maintain the fuel tank vacuum. As the engine remains off during the auto-stop, the fuel tank pressure increases as the fuel tank vacuum decays (plot 410). Further, due to the prolonged auto-stop duration, the fuel tank pressure increases above the second fuel tank vacuum threshold (dashed line 409) before the engine is restarted at time t7 (plot 404). However, because the canister load (plot 414) is less than an upper threshold load (dashed line 417), the engine is not restarted for the purpose of generating additional fuel tank vacuum and remains off (plot 404).

In response to the engine restart at time t7, shortly after the expected duration d2 elapses, the CPV and the CVV are commanded open (plots 406 and 408, respectively). Intake manifold vacuum generated from the engine spinning up is applied to the evaporative emissions and fuel system via the purge line and the open CPV. At time t7, the fuel tank pressure is greater than the second fuel tank vacuum threshold (dashed line 409). With the fuel tank pressure greater than the second fuel tank vacuum threshold (e.g., the fuel tank vacuum is less than the second fuel tank vacuum threshold), the first flow path from the fuel tank is less restrictive than the second flow path from the fuel vapor storage canister, and gas flows to the intake manifold primarily from the fuel tank (plot 412). As the fuel tank pressure decreases below the second fuel tank vacuum threshold, the relative flow switches from favoring the first flow path from the fuel tank to favoring the second flow path from fuel vapor storage canister (plot 412), and fuel vapors are desorbed from adsorbent in the fuel vapor storage canister and purged to the intake manifold via the purge line and the open CPV for combustion in the engine.

The fuel vapor canister load decreases during the purging (plot 414), and at time t8, the fuel vapor canister load reaches the threshold load (dashed line 415), indicating that the purge event is complete. In response, the controller closes the CPV (plot 406) to isolate the evaporative emissions system and fuel system from the intake manifold. The CVV remains open (plot 408) to couple the evaporative emissions system and the fuel system to the atmosphere. As a result, the fuel tank pressure again increases toward atmospheric pressure (plot 410). Further, the fuel vapor storage canister load increases as the engine is operated (plot 414) due to running loss vapors.

FIG. 5 shows an example timeline 500 for adjusting valves of an evaporative emissions system of a vehicle (e.g., evaporative emissions system 219 of FIG. 2) to pre-charge a fuel tank (e.g., fuel tank 220 of FIG. 2) with vacuum during an engine shutdown for an auto-stop and then further adjusting the valves during an engine restart from the auto-stop to efficiently purge a fuel vapor storage canister of the evaporative emissions system (e.g., fuel vapor storage canister 222 of FIG. 2). In particular, example timeline 500 illustrates how an ELCM vacuum pump positioned in a vent of the evaporative emissions system (e.g., pump 238 of FIG. 2) may be utilized for generating additional fuel tank vacuum. Vehicle status is shown in plot 502, engine status is shown in plot 504, engine speed is shown in plot 505, canister purge valve (CPV) position is shown in plot 506, canister vent valve (CVV) position is shown in plot 508, fuel tank pressure is shown in plot 510, ELCM pump status is shown in plot 512, and fuel vapor storage canister load is shown in plot 514.

For all of the above, the horizontal axis represents time, with time increasing along the horizontal axis from left to right. The vertical axis represents each labeled parameter. For plot 502, the vertical axis represents whether the vehicle is on (e.g., with an ignition key in an "on" position) or off (e.g., with the ignition key in an "off" position), as labeled. For plot 504, the vertical axis represents whether the engine is on (e.g., with combustion occurring in engine cylinders) or off (e.g., with no combustion occurring in the engine cylinders), as labeled. For plot 505, the engine speed increases along the vertical axis from bottom to top. For plots 506 and 508, the vertical axis represents whether the CPV and the CVV are open (e.g., fully open) or closed (e.g., fully closed), respectively, as labeled. For plot 510, the vertical axis shows the fuel tank pressure with respect to atmospheric pressure ("Atm"); positive pressure values correspond to pressures above atmospheric pressure, and negative pressure (e.g., vacuum) values correspond to pressures that are less than atmospheric pressure. For plot 512, the vertical axis indicates whether the ELCM pump is off (e.g., deactivated), on and operating in a positive pressure mode ("pos pressure"), or on and operating in a negative pressure mode ("neg pressure"), as labeled. For example, in the positive pressure mode, the pump draws air from the atmosphere through the vent and pumps it into the evaporative emissions system and fuel system to increase the pressure therein, and in the negative pressure mode, the pump draws air from the evaporative emissions system and fuel system and releases it through the vent to the atmosphere to decrease the pressure (e.g., increase the vacuum) therein. For plot 514, the magnitude of the canister load increases along the vertical axis from bottom to top.

Prior to time t1, the vehicle is on (plot 502) and the engine is on (plot 504) and operating at a non-zero speed (plot 505). Thus, the vehicle is operated in an engine mode of operation, in which the engine supplies at least a portion of the torque for propelling the vehicle. The CPV is closed (plot 506), isolating the evaporative emissions system and the fuel system from an intake manifold of the engine, and the CVV is open (plot 508), coupling the evaporative emissions system and the fuel system to atmosphere. With the engine on and combusting fuel, a small vacuum is generated in the fuel tank (plot 510), and the fuel vapor storage canister load gradually increases due to running loss vapors (plot 514).

At time t1, the engine is shut down (plot 504) for an auto-stop while the vehicle remains on (plot 502). For example, the auto-stop may be requested for an idle-stop or to operate the vehicle in an electric mode, as described above with respect to FIGS. 3A and 3B. In response to the auto-stop request, a controller of the vehicle estimates an expected duration d1 for the auto-stop based on data received from vehicle-to-vehicle and vehicle-to-infrastructure networks as well as vehicle operating conditions, including a state of charge of a system battery. The controller then determines a first fuel tank vacuum threshold, represented by dashed line 511, based on the expected duration d1. In the example of timeline 500, the expected duration is relatively long, and the first fuel tank vacuum threshold is set as a maximum fuel tank vacuum threshold value.

Further, the controller commands closed the CVV (plot 508) to seal the evaporative emissions system and the fuel system from the atmosphere and commands open the CPV (plot 506) to couple the evaporative emissions system and fuel system to the intake manifold in response to the engine auto-stop at time t1. Intake manifold vacuum, generated from a reciprocating motion of a piston within each engine cylinder, is applied to the evaporative emissions system and fuel system via a purge line and the open CPV as the engine spins down to rest between time t1 and time t2. With the CVV closed, a first flow path coupling the fuel tank to the intake manifold is less restrictive that a second flow path coupling the vapor storage canister to the intake manifold, and gas (e.g., air stripped of fuel vapors by adsorbent in the fuel vapor canister) flows to the intake manifold primarily from the fuel tank. An amount of vacuum in the fuel tank increases (e.g., the fuel tank pressure decreases and becomes more negative) as the intake manifold vacuum evacuates the fuel tank, as shown in plot 510.

At time t2, the engine speed reaches zero (plot 505). However, the fuel tank pressure (plot 510) has not yet reached the first fuel tank vacuum threshold (dashed line 511). In response, the CPV is commanded closed (plot 506) to isolate the fuel tank from the intake manifold, as the engine is no longer generating vacuum. The ELCM pump is activated, such as by supplying electrical power to the ELCM pump, and operated in the negative pressure mode (plot 512). The CVV is opened (plot 508) so that the ELCM pump draws vacuum on the evaporative emissions system and fuel system, and the fuel tank pressure (plot 510) decreases accordingly.

At time t3, the fuel tank pressure (plot 510) reaches the first fuel tank vacuum threshold (dashed line 511). In response, the ELCM pump is deactivated (plot 512), such as by no longer supplying electrical power to the ELCM pump, and the CVV is commanded closed (plot 508) to isolate the evaporative emissions system and fuel system from atmosphere and maintain the fuel tank vacuum. As the engine remains off during the auto-stop, the fuel tank vacuum naturally decays, resulting in the fuel tank pressure (plot 510) increasing (e.g., becoming less negative). Due to the prolonged auto-stop duration, at time t4, the fuel tank pressure reaches a second fuel tank vacuum threshold (dashed line 509) while the engine remains off (plot 504). Even though the fuel vapor storage canister load (plot 514) remains below an upper threshold load represented by dashed line 517, the inclusion of the ELCM pump enables vacuum to be regenerated in the fuel tank without incurring fuel economy or emissions penalties.

Therefore, in response to the fuel tank pressure reaching the second fuel tank vacuum threshold, the ELCM pump is operated in the negative pressure mode (plot 512) and the CVV is commanded open (plot 508) to increase the fuel tank vacuum until the fuel tank pressure reaches the first fuel tank vacuum threshold. Further, the first fuel tank vacuum threshold is adjusted (e.g., decreased) based on an amount of time remaining in the expected duration d1. In response to the fuel tank pressure (plot 510) reaching the adjusted first fuel tank vacuum threshold (dashed line 511) at time t5, the ELCM pump is deactivated (plot 512) and the CVV is again commanded closed (plot 508).

At time t6, the engine is restarted (plot 504). In response to the engine restart, the CPV and the CVV are commanded open (plots 506 and 508, respectively). Intake manifold vacuum generated from the engine spinning up is applied to the evaporative emissions and fuel system via the purge line and the open CPV. At time t6, the fuel tank pressure (plot 510) remains less than the second fuel tank vacuum threshold (dashed line 509) due to the use of the ELCM pump between time t4 and time t5. With the CVV open and the fuel tank pressure less than the second fuel tank vacuum threshold, the fuel vapor storage canister forms a less restrictive flow path than the fuel tank, and gas (e.g., air and desorbed fuel vapors) flows to the intake manifold primarily from the fuel vapor storage canister, expediting canister purging. For example, the intake manifold vacuum pulls fresh air in through the vent and the open CVV, which passes through bleed canisters positioned along the vent and through the fuel vapor storage canister, desorbing fuel vapors from the bleed canisters and the fuel vapor storage canister that are purged to the intake manifold via the purge line and the open CPV.

As the fuel vapor canisters are desorbed and purged, the fuel vapor canister load decreases (plot 514). At time t7, the fuel vapor canister load reaches a lower threshold load represented by dashed line 515, indicating that the purge event is complete. In response, the controller closes the CPV (plot 506) to isolate the evaporative emissions system and the fuel system from the intake manifold. The CVV remains open (plot 508) to couple the evaporative emissions system and the fuel system to the atmosphere. As a result, the fuel tank pressure increases toward atmospheric pressure (plot 510). Further, the fuel vapor storage canister load increases as the engine is operated (plot 514) due to running loss vapors. Due to the complete, efficient purging at the engine restart, the fuel vapor storage canister has a relatively large capacity for storing additional fuel vapors. In comparison, had the ELCM pump not been used to generate additional fuel tank vacuum between time t4 and time t5, it would take a longer duration for the fuel vapor storage canister load to reach the lower threshold load, as indicated by dashed segment 514a.

In this way, a fuel vapor storage canister is more efficiently purged upon engine restart by pre-charging a fuel tank with vacuum. For example, time spent re-establishing vacuum in the fuel tank during a beginning of the purge event is reduced or avoided. Further, vacuum that is naturally generated during engine pull down can be used to generate vacuum in the fuel tank using existing evaporative emissions system valves and conduits, thereby reducing evaporative emissions system costs and complexity and reducing a number of potential sources of degradation. Further still, when the evaporative emissions system includes a vacuum pump, the vacuum pump can be advantageously used to supplement the vacuum generated during engine pull down and/or to maintain vacuum in the fuel tank while the engine is off. By reducing an amount of vacuum drawn on the fuel tank during purging, an amount of vacuum drawn on the fuel vapor storage canister is increased, resulting in more complete fuel vapor storage canister purging in a smaller amount of time. Overall, vehicle bleed emissions may be reduced.

The technical effect of generating and storing vacuum in a fuel tank of a vehicle during an engine auto-stop is that a fuel vapor canister may be efficiently purged upon engine restart without isolating the fuel tank from the fuel vapor storage canister.

As one example, a method comprises: generating vacuum in a fuel tank fluidically coupled to an evaporative emissions system during an auto-stop of an engine while the engine spins down to rest; and purging vapors to an intake manifold of the engine during a subsequent auto-start of the engine while an amount of vacuum in the fuel tank is greater than a lower threshold. In the preceding example, additionally or optionally, generating vacuum in the fuel tank comprises: closing a canister vent valve in a vent line that couples the evaporative emissions system to atmosphere; opening a canister purge valve in a purge line that couples the evaporative emissions system to the intake manifold; and closing the canister purge valve in response to the amount of vacuum in the fuel tank reaching an upper threshold. In one or both of the preceding examples, the method additionally or optionally further comprises, in response to the engine spinning down to rest before the amount of vacuum in the fuel tank reaches the upper threshold, closing the canister purge valve; and operating a vacuum pump coupled in the vent line while opening the canister vent valve until the amount of vacuum in the fuel tank reaches the upper threshold. In any or all of the preceding examples, the method additionally or optionally further comprises, in response to the amount of vacuum in the fuel tank falling below the lower threshold during the auto-stop and after the engine spins down to rest, operating the vacuum pump while opening the canister vent valve until the vacuum in the fuel tank reaches a threshold that is greater than the lower threshold and less than or equal to the upper threshold. In any or all of the preceding examples, additionally of optionally, upper threshold is determined based on an expected duration of the auto-stop. In any or all of the preceding examples, additionally of optionally, the expected duration of the auto-stop is estimated based on data received from vehicle-to-vehicle and vehicle-to-infrastructure networks. In any or all of the preceding examples, additionally of optionally, purging vapors from the evaporative emissions system to the intake manifold of the engine during the subsequent auto-start of the engine includes: opening the canister purge valve and opening the canister vent valve in response to combustion resuming in the engine; and closing the canister purge valve in response to a load of a fuel vapor storage canister of the evaporative emissions system decreasing to a threshold load. In any or all of the preceding examples, additionally of optionally, a primary purge flow during the purging originates from the evaporative emissions system relative to the fuel tank while the amount of vacuum in the fuel tank is greater than the lower threshold. In any or all of the preceding examples, additionally of optionally, no restricting components are positioned in a conduit fluidically coupling the fuel tank and the evaporative emissions system.

As another example, a method comprises: in response to a request to shut down an engine of a vehicle while the vehicle remains on, applying vacuum from an intake manifold of the engine to a fuel tank as the engine spins down to rest until a first threshold fuel tank vacuum is reached; and adjusting the first threshold fuel tank vacuum based on an expected engine-off duration. In the preceding example, additionally or optionally, adjusting the first threshold fuel tank vacuum based on the expected engine-off duration includes increasing the first threshold fuel tank vacuum as the expected engine-off duration increases until the first threshold fuel tank vacuum reaches a maximum. In one or both of the preceding examples, additionally or optionally, applying vacuum from the intake manifold of the engine to the fuel tank as the engine spins down to rest until the first threshold fuel tank vacuum is reached comprises: opening a canister purge valve in a purge line that fluidically couples the fuel tank to the intake manifold via a fuel vapor storage canister and closing a canister vent valve in a vent line that the couples the fuel tank to atmosphere via the fuel vapor storage canister; closing the canister purge valve and maintaining closed the canister vent valve in response to an amount of vacuum in the fuel tank reaching the first threshold fuel tank vacuum; and in response to a request to restart the engine, purging vapors to the intake manifold as the engine spins up by opening the canister purge valve and opening the canister vent valve. In any or all of the preceding examples, the method additionally of optionally further comprises applying additional vacuum to the fuel tank responsive to the amount of vacuum in the fuel tank reaching a second threshold fuel tank vacuum, the second threshold fuel tank vacuum less than the first threshold fuel tank vacuum, after the engine spins down to rest and before the request to restart the engine. In any or all of the preceding examples, additionally of optionally, the applying additional vacuum to the fuel tank is further responsive to a load of the fuel vapor storage canister that is greater than an upper threshold load, and the applying the additional vacuum to the fuel tank comprises: restarting the engine while opening the canister purge valve and maintaining closed the canister vent valve to apply vacuum from the intake manifold of the engine to the fuel tank; and shutting down the engine and closing the canister purge valve in response to the amount of vacuum in the fuel tank reaching a threshold fuel tank vacuum that is greater than the second threshold fuel tank vacuum. In any or all of the preceding examples, additionally of optionally, the applying the additional vacuum to the fuel tank comprises: opening the canister vent valve and activating a vacuum pump coupled in the vent line in a negative pressure mode; and closing the canister vent valve and deactivating the vacuum pump in response to the amount of vacuum in the fuel tank reaching a threshold fuel tank vacuum that is greater than the second threshold fuel tank vacuum.

As another example, a system for a vehicle comprises: an engine system, including an engine configured to propel the vehicle by combusting air and fuel; a fuel system, including a fuel tank for storing the fuel; an evaporative emissions system fluidically coupled to the fuel system and an intake manifold of the engine, the evaporative emissions system including a fuel vapor storage canister; a canister vent valve positioned in a vent line of the evaporative emissions system; a canister purge valve positioned in a purge line coupling the evaporative emissions system and the intake manifold; and a controller storing instructions in non-transitory memory that, when executed, cause the controller to: close the canister vent valve and open the canister purge valve in response to pulling down the engine for an engine shutdown request; close the canister purge valve in response to a vacuum amount in the fuel tank reaching a first threshold while pulling down the engine for the engine shutdown request; operate the vehicle with the engine off for the engine shutdown request; and open the canister purge valve and the canister vent valve in response to pulling up the engine for an engine restart request. In the preceding example, the system additionally or optionally further comprises an electric machine and a system battery, wherein the engine shutdown request is a request to transition from an engine mode of operation to an electric mode of operation, and wherein the controller stores further instructions in non-transitory memory that, when executed while operating the vehicle with the engine off for the engine shutdown request, cause the controller to: propel the vehicle via torque from the electric machine, the electric machine drawing power from the system battery. In any or all of the preceding examples, additionally of optionally, the engine shutdown request is in response to an idle time of the engine surpassing a duration. In any or all of the preceding examples, additionally of optionally, the controller stores further instructions in non-transitory memory that, when executed, cause the controller to: estimate an expected duration for operating the vehicle with the engine off for the engine shutdown request based on one or more of vehicle-to-vehicle communications and vehicle-to-infrastructure communications received via a wireless network; and determine the first threshold based on the expected duration. In any or all of the preceding examples, the system additionally of optionally further comprises an evaporative leak check module coupled in the vent line, the evaporative leak check module including a vacuum pump, and wherein the controller stores further instructions in non-transitory memory that, when executed, cause the controller to: activate the vacuum pump in response to the vacuum amount in the fuel tank remaining below the first threshold while pulling down the engine for the engine shutdown request; and activate the vacuum pump in response to the vacuum amount in the fuel tank decreasing to the second threshold while operating the vehicle with the engine off for the engine shutdown request.

In another representation, a method comprises: generating vacuum in a fuel tank fluidically coupled to an evaporative emissions system during an auto-stop of an engine via a combination of intake manifold vacuum generated while the engine spins down to rest and vacuum generated by a pump of the evaporative emissions system; and maintaining the vacuum in the fuel tank above a lower threshold level during the auto-stop. In the preceding example, additionally or optionally, the generating vacuum in the fuel tank via the combination of the intake manifold vacuum generated while the engine spins down to rest and the vacuum generated by the pump of the evaporative emissions system includes: closing a canister vent valve in a vent line that couples the evaporative emissions system to atmosphere; opening a canister purge valve in a purge line that couples the evaporative emissions system to the intake manifold; and closing the canister purge valve in response to the vacuum in the fuel tank reaching an upper threshold level or a speed of the engine reaching zero. In one or both of the preceding examples, additionally or optionally, the generating vacuum in the fuel tank via the combination of the intake manifold vacuum generated while the engine spins down to rest and the vacuum generated by the pump of the evaporative emissions system further includes: in response to the engine speed reaching zero prior to the vacuum in the fuel tank reaching the upper threshold level, opening the canister vent valve and operating the pump in a negative pressure mode; and closing the canister vent valve and deactivating the pump in response to the vacuum in the fuel tank reaching the upper threshold level. In any or all of the preceding examples, additionally or optionally, maintaining the vacuum in the fuel tank above the lower threshold level during the auto-stop includes opening the canister vent valve and operating the pump in the negative pressure mode in response to the vacuum in the fuel tank decaying to the lower threshold level during the auto-stop.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
generating vacuum in a fuel tank fluidically coupled to an evaporative emissions system during an auto-stop of an engine while the engine spins down to rest; and
purging vapors to an intake manifold of the engine during a subsequent auto-start of the engine while an amount of vacuum in the fuel tank is greater than a lower threshold.

2. The method of claim 1, wherein generating vacuum in the fuel tank comprises:
closing a canister vent valve in a vent line that couples the evaporative emissions system to atmosphere;
opening a canister purge valve in a purge line that couples the evaporative emissions system to the intake manifold; and
closing the canister purge valve in response to the amount of vacuum in the fuel tank reaching an upper threshold.

3. The method of claim 2, further comprising:
in response to the engine spinning down to rest before the amount of vacuum in the fuel tank reaches the upper threshold,
closing the canister purge valve; and
operating a vacuum pump coupled in the vent line while opening the canister vent valve until the amount of vacuum in the fuel tank reaches the upper threshold.

4. The method of claim 3, further comprising:
in response to the amount of vacuum in the fuel tank falling below the lower threshold during the auto-stop and after the engine spins down to rest, operating the vacuum pump while opening the canister vent valve until the vacuum in the fuel tank reaches a threshold that is greater than the lower threshold and less than or equal to the upper threshold.

5. The method of claim 2, wherein the upper threshold is determined based on an expected duration of the auto-stop.

6. The method of claim 5, wherein the expected duration of the auto-stop is estimated based on data received from vehicle-to-vehicle and vehicle-to-infrastructure networks.

7. The method of claim 2, wherein purging vapors from the evaporative emissions system to the intake manifold of the engine during the subsequent auto-start of the engine includes:

opening the canister purge valve and opening the canister vent valve in response to combustion resuming in the engine; and closing the canister purge valve in response to a load of a fuel vapor storage canister of the evaporative emissions system decreasing to a threshold load.

8. The method of claim 1, wherein a primary purge flow during the purging originates from the evaporative emissions system relative to the fuel tank while the amount of vacuum in the fuel tank is greater than the lower threshold.

9. The method of claim 1, wherein no restricting components are positioned in a conduit fluidically coupling the fuel tank and the evaporative emissions system.

10. A method, comprising:
in response to a request to shut down an engine of a vehicle while the vehicle remains on, applying vacuum from an intake manifold of the engine to a fuel tank as the engine spins down to rest until a first threshold fuel tank vacuum is reached; and
adjusting the first threshold fuel tank vacuum based on an expected engine-off duration.

11. The method of claim 10, wherein adjusting the first threshold fuel tank vacuum based on the expected engine-off duration includes increasing the first threshold fuel tank vacuum as the expected engine-off duration increases until the first threshold fuel tank vacuum reaches a maximum.

12. The method of claim 10, wherein applying vacuum from the intake manifold of the engine to the fuel tank as the engine spins down to rest until the first threshold fuel tank vacuum is reached comprises:
opening a canister purge valve in a purge line that fluidically couples the fuel tank to the intake manifold via a fuel vapor storage canister and closing a canister vent valve in a vent line that the couples the fuel tank to atmosphere via the fuel vapor storage canister;
closing the canister purge valve and maintaining closed the canister vent valve in response to an amount of vacuum in the fuel tank reaching the first threshold fuel tank vacuum; and
in response to a request to restart the engine, purging vapors to the intake manifold as the engine spins up by opening the canister purge valve and opening the canister vent valve.

13. The method of claim 12, further comprising:
applying additional vacuum to the fuel tank responsive to the amount of vacuum in the fuel tank reaching a second threshold fuel tank vacuum, the second threshold fuel tank vacuum less than the first threshold fuel tank vacuum, after the engine spins down to rest and before the request to restart the engine.

14. The method of claim 13, wherein the applying additional vacuum to the fuel tank is further responsive to a load of the fuel vapor storage canister that is greater than an upper threshold load, and the applying the additional vacuum to the fuel tank comprises:
restarting the engine while opening the canister purge valve and maintaining closed the canister vent valve to apply vacuum from the intake manifold of the engine to the fuel tank; and
shutting down the engine and closing the canister purge valve in response to the amount of vacuum in the fuel tank reaching a threshold fuel tank vacuum that is greater than the second threshold fuel tank vacuum.

15. The method of claim 13, wherein the applying the additional vacuum to the fuel tank comprises:

opening the canister vent valve and activating a vacuum pump coupled in the vent line in a negative pressure mode; and
closing the canister vent valve and deactivating the vacuum pump in response to the amount of vacuum in the fuel tank reaching a threshold fuel tank vacuum that is greater than the second threshold fuel tank vacuum.

16. A system for a vehicle, comprising:
an engine system, including an engine configured to propel the vehicle by combusting air and fuel;
a fuel system, including a fuel tank for storing the fuel;
an evaporative emissions system fluidically coupled to the fuel system and an intake manifold of the engine, the evaporative emissions system including a fuel vapor storage canister;
a canister vent valve positioned in a vent line of the evaporative emissions system;
a canister purge valve positioned in a purge line coupling the evaporative emissions system and the intake manifold; and
a controller storing instructions in non-transitory memory that, when executed, cause the controller to:
close the canister vent valve and open the canister purge valve in response to pulling down the engine for an engine shutdown request;
close the canister purge valve in response to a vacuum amount in the fuel tank reaching a first threshold while pulling down the engine for the engine shutdown request;
operate the vehicle with the engine off for the engine shutdown request; and
open the canister purge valve and the canister vent valve in response to pulling up the engine for an engine restart request.

17. The system of claim 16, further comprising an electric machine and a system battery, wherein the engine shutdown request is a request to transition from an engine mode of operation to an electric mode of operation, and wherein the controller stores further instructions in non-transitory memory that, when executed while operating the vehicle with the engine off for the engine shutdown request, cause the controller to:
propel the vehicle via torque from the electric machine, the electric machine drawing power from the system battery.

18. The system of claim 16, wherein the engine shutdown request is in response to an idle time of the engine surpassing a duration.

19. The system of claim 16, wherein the controller stores further instructions in non-transitory memory that, when executed, cause the controller to:
estimate an expected duration for operating the vehicle with the engine off for the engine shutdown request based on one or more of vehicle-to-vehicle communications and vehicle-to-infrastructure communications received via a wireless network; and
determine the first threshold based on the expected duration.

20. The system of claim 16, further comprising an evaporative leak check module coupled in the vent line, the evaporative leak check module including a vacuum pump, and wherein the controller stores further instructions in non-transitory memory that, when executed, cause the controller to:

activate the vacuum pump in response to the vacuum amount in the fuel tank remaining below the first threshold while pulling down the engine for the engine shutdown request; and activate the vacuum pump in response to the vacuum amount in the fuel tank decreasing to the second threshold while operating the vehicle with the engine off for the engine shutdown request.

\* \* \* \* \*